United States Patent
Taoka et al.

(10) Patent No.: US 6,921,133 B2
(45) Date of Patent: Jul. 26, 2005

(54) SEAT FOR CAR

(75) Inventors: Yoshifumi Taoka, Kawanishi (JP); Tetsurou Ushijima, Ikeda (JP)

(73) Assignee: Daihatsu Motor Co., Ltd., Osaka (JP)

( * ) Notice: Subject to any disclaimer, the term of this patent is extended or adjusted under 35 U.S.C. 154(b) by 0 days.

(21) Appl. No.: 10/468,566

(22) PCT Filed: Feb. 20, 2002

(86) PCT No.: PCT/JP02/01510

§ 371 (c)(1),
(2), (4) Date: Aug. 21, 2003

(87) PCT Pub. No.: WO02/066285

PCT Pub. Date: Aug. 29, 2002

(65) Prior Publication Data

US 2004/0075313 A1 Apr. 22, 2004

(30) Foreign Application Priority Data

| Feb. 21, 2001 | (JP) | 2001-045262 |
| May 17, 2001 | (JP) | 2001-147494 |
| Jul. 30, 2001 | (JP) | 2001-229985 |
| Jul. 30, 2001 | (JP) | 2001-229986 |

(51) Int. Cl.[7] .................. B60N 2/427; B60R 21/02; A47D 1/10
(52) U.S. Cl. .............. 297/216.16; 297/216.2; 297/216.11; 297/216.15; 297/216.19; 297/250.1; 297/256.13; 297/284.11
(58) Field of Search .............. 297/216.1, 216.15, 297/216.16, 216.19, 284.11, 216.11, 250.1, 256.13, 216.26

(56) References Cited

U.S. PATENT DOCUMENTS

| 4,225,178 A | | 9/1980 | Takada ................ 297/216.1 |
| 5,110,182 A | * | 5/1992 | Beauvais ............ 297/216.11 |
| 5,125,472 A | | 6/1992 | Hara .................. 297/216.1 |
| 5,236,221 A | * | 8/1993 | Minami ........... 297/256.13 X |
| 5,462,333 A | * | 10/1995 | Beauvais ............ 297/216.11 |
| 5,551,751 A | * | 9/1996 | Sedlack et al. ...... 297/256.13 |
| 6,050,635 A | * | 4/2000 | Pajon et al. ........ 297/216.1 |
| 6,152,525 A | * | 11/2000 | Carine et al. ....... 297/216.11 |
| 6,254,181 B1 | * | 7/2001 | Aufrere et al. ...... 297/216.1 |

(Continued)

FOREIGN PATENT DOCUMENTS

| EP | 0 927 659 | 7/1999 |
| EP | 0 965 479 | 12/1999 |
| EP | 1 067 015 | 1/2001 |
| JP | 5-77686 | 3/1993 |
| JP | 5-178137 | 7/1993 |
| JP | 05-238297 | 9/1993 |
| JP | 6-33754 | 5/1994 |
| JP | 7-5898 | 1/1995 |
| JP | 07-081466 | 3/1995 |
| JP | 2001-146127 | 5/2001 |

*Primary Examiner*—Rodney B. White
(74) *Attorney, Agent, or Firm*—Jordan and Hamburg LLP

(57) ABSTRACT

A catch member (14) extending in the width direction of a seat cushion (1) is arranged inside a front portion of the seat cushion (1) and is supported so as to be vertically movable. There are also provided a torsion spring (16) for urging the catch member (14) to move upward and a pendulum member (18) for operating with an inertial force upon an abrupt deceleration to inhibit vertical movement of the catch part. When a passenger sits on the seat cushion (1), the catch member (14) moves downward to preclude deterioration in seating comfort. When the passenger's rear end (22) starts to move forward upon an abrupt deceleration, the catch member (14) is locked and the rear end (22) is caught by the catch member (14). This makes it possible to suppressed the forward movement of the passenger with reliability, and allow lightweight and low-cost configuration with simple configuration.

17 Claims, 31 Drawing Sheets

U.S. PATENT DOCUMENTS

| | | | |
|---|---|---|---|
| 6,386,631 B1 * | 5/2002 | Masuda et al. | 297/216.1 |
| 6,435,610 B2 * | 8/2002 | Kondo et al. | 297/284.11 |
| 6,450,573 B1 * | 9/2002 | Yamaguchi et al. | 297/216.1 |
| 6,478,378 B2 * | 11/2002 | Muhlberger et al. | 297/216.1 X |
| 6,505,888 B1 * | 1/2003 | Teufel et al. | 297/216.1 X |
| 6,557,935 B2 * | 5/2003 | Choi | 297/216.1 |
| 6,604,599 B2 * | 8/2003 | Yamaguchi et al. | 297/216.1 X |
| 6,612,647 B1 * | 9/2003 | Munch et al. | 297/216.1 |
| 6,669,288 B2 * | 12/2003 | Nakagawa | 297/216.11 X |
| 6,733,075 B2 * | 5/2004 | Schumann et al. | 297/216.1 X |
| 6,755,465 B2 * | 6/2004 | Yamaguchi et al. | 297/216.1 |
| 6,796,610 B2 * | 9/2004 | Nakagawa et al. | 297/216.11 X |
| 2001/0022460 A1 * | 9/2001 | Kondo et al. | 297/284.11 |
| 2002/0003365 A1 * | 1/2002 | Yamaguchi et al. | 297/216.1 |
| 2002/0024242 A1 * | 2/2002 | Becker et al. | 297/216.1 |
| 2002/0053792 A1 * | 5/2002 | Yamaguchi et al. | 297/216.1 X |
| 2003/0034679 A1 * | 2/2003 | Choi | 297/216.1 |
| 2003/0222490 A1 * | 12/2003 | Sakai | 297/216.1 |

* cited by examiner

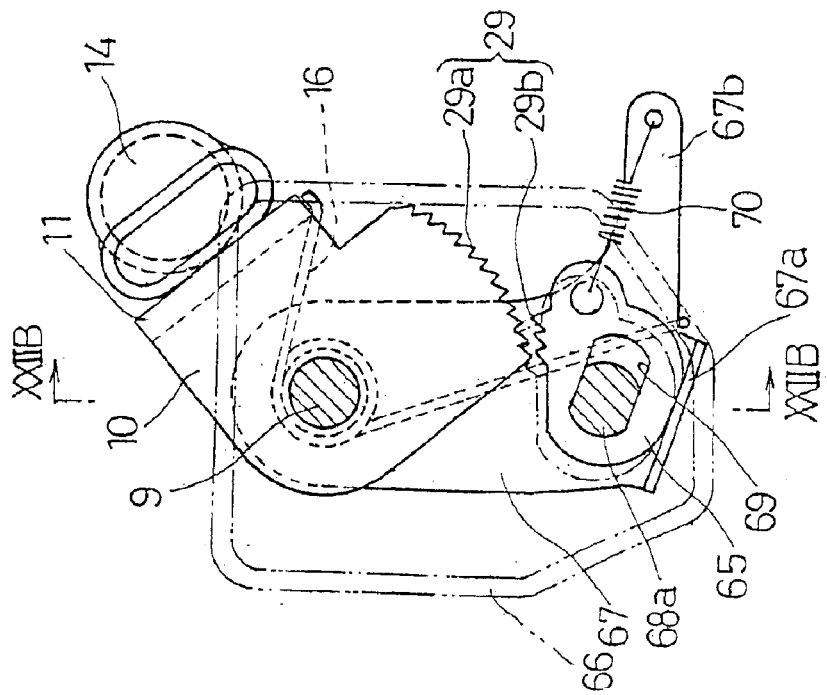
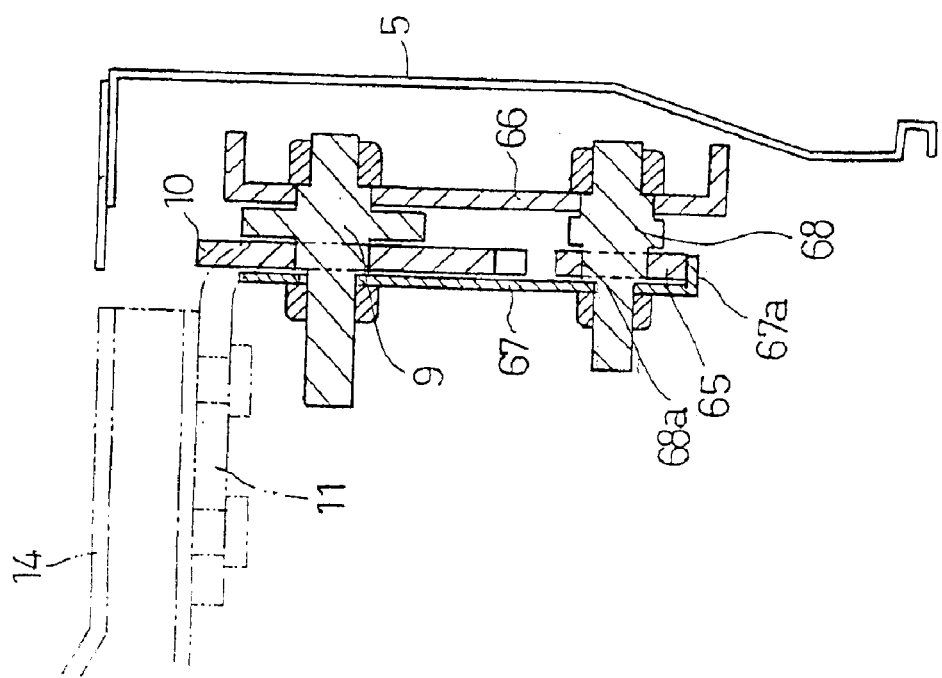

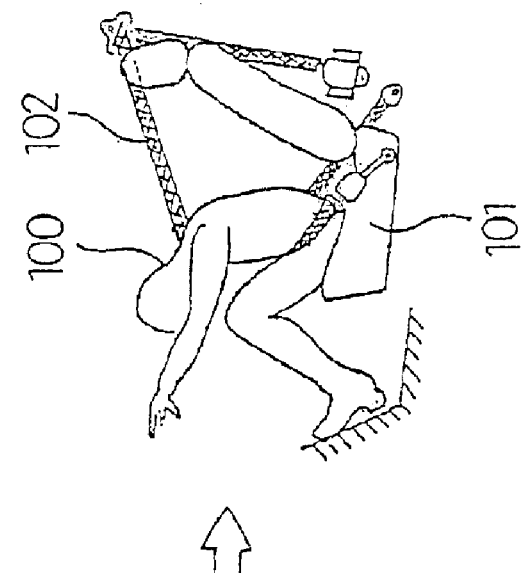
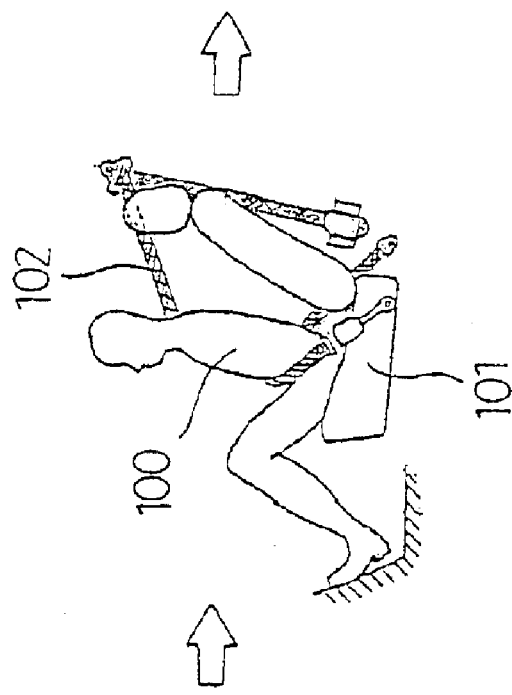
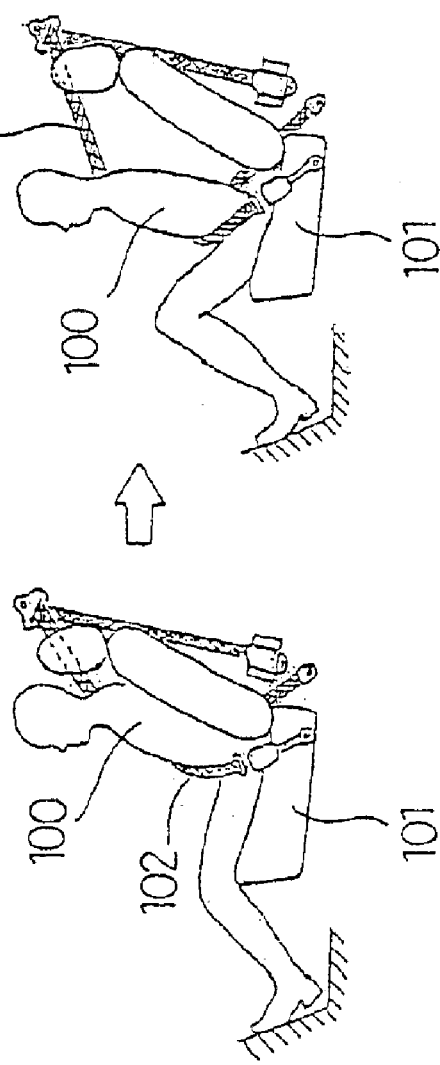

SEAT FOR CAR

TECHNICAL FIELD

The present invention relates to a car seat, and more particularly to a car seat which is provided with the function of surely inhibiting a passenger from sinking into the seat cushion and moving forward as well upon an abrupt vehicle deceleration.

BACKGROUND ART

Conventionally, seat belts are provided as the means for preventing passengers from moving forward inertially upon an abrupt vehicle deceleration. Nevertheless, there has been the problem that they fail to function effectively when the passengers' rear end sinks into the seat cushions and moves forward as well. Description will be given with reference to FIGS. 34A to 34C. If a frontal crash occurs when a passenger 100 is sitting on a seat cushion 101 properly and wearing a seat belt 102 as shown in FIG. 34A, the passenger 100 sinks and moves forward as shown in FIG. 34B due to an inertial force. Then, at a maximum deceleration, the rear end of the passenger 100 sinks into the seat cushion 101 and moves over to the front end thereof as shown in FIG. 34C. This is sometimes referred to as submarine phenomenon.

To prevent the rear end of the passenger 100 from moving to the front of the seat cushion 101 thus, there has been proposed as shown in FIG. 35 that the seat cushion 101 be provided with a cross member 103 such as a pipe across the lateral width direction of the seat cushion 101, in a position in front of the rear end of the passenger 100 in a proper seating state. Consequently, by the cross member 103 catching the rear end of the passenger 100, the cross member 103 can be deformed to absorb the impact and suppress the forward movement.

When the cross member 103 such as a pipe is arranged in the front portion of the seat cushion 101, however, there occurs the problem that the seating comfort of the passenger 100 deteriorates to hamper driving comfort. On the other hand, when the position of arrangement of the cross member 103 is lowered to a position having no impact on the seating comfort, there arises the problem that the effect of preventing the forward movement of the passenger 100 is no longer obtained.

Then, as shown in FIGS. 36A and 36B, there has been proposed one in which: under normal conditions, the cross member 103 is situated in a lower position as shown in FIG. 36A; and upon a crash, driving means 105 such as an inflator is activated to lift up the cross member 103 as shown in FIG. 36B via interlocking means 104 such as a link mechanism if needed. Technical means of this type have been disclosed, for example, in Japanese Patent Laid-Open Publication No. Hei 5-238297, Japanese Patent Laid-Open Publication No. Hei 7-81466, and so on. In addition, Japanese Utility Model Laid-Open Publication No. Hei 7-5898 has disclosed one in which the front portion of the seat cushion itself is lifted upon a crash.

Moreover, the present applicant has proposed in Japanese Patent Application No. 2000-38402 a configuration in which a catch member extending horizontally is arranged inside a seat cushion as supported by a guide so as to be vertically movable, and means is provided for urging the catch member upward. The catch member smoothly moves downward when a load acts thereon from above. The catch member comes into engagement with a front side edge of the guide and is inhibited from moving downward when a load acts thereon from behind. The forward movement of the passenger is caught by this catch member.

The configuration shown in FIGS. 36A and 36B and the configurations disclosed in the foregoing individual publications, however, require a mechanism for lifting the cross member 103 forcibly at necessary time, driving means 104 and 105 thereof, and the like. This gives rise to the problem that the apparatus becomes complicated with an increase in cost and with an increase in weight.

Meanwhile, in the configuration disclosed in Japanese Patent Application No. 2000-38402 described above, the configuration is simple and the seating comfort at the time of seating is acceptable. However, when the passenger's rear end moves forward upon a frontal crash, the catch member may be diverted down by a downward component of the load acting on the catch member. This means the problem that the stable effect of preventing the passenger's forward movement cannot be obtained with stability.

Moreover, in recent years, it is legally obligatory in many countries to use child seats when children are on vehicles. Then, various systems have been proposed as the system for installing a child seat on a seat cushion 101. For example, in a method, the child seat is placed on the seat cushion 101 and fixed by using a seat belt 102. The fixing method, however, is troublesome and requires skills to establish a highly reliable state of fixing quickly. This also means the problem that there can occur insecure fixing.

Among the other systems proposed is one in which an anchor 109 is attached to a body frame 108 so as to lie between the rear end of the seat cushion 101 and the bottom end of a seat back 107, and a to-be-engaged portion 111 capable of being engaged with the anchor 109 is arranged on a rear bottom portion of the child seat 110 as shown in FIG. 37. The child seat 110 is placed on the seat cushion 101 and fixed by engaging the to-be-engaged portion 111 with the anchor 109. This system is prescribed by ISO standards and is referred to as ISO system.

In this system, there is no possibility that the child seat 100 is thrown forward upon an abrupt deceleration, whereas the child seat 100 undergoes forward rotation moment about the engaging point between the to-be-engaged portion 111 and the anchor 109 as shown by the arrow. Due to the cushioning of the seat cushion 101, as shown by the imaginary lines in FIG. 37, the front portion of the seat cushion 101 easily yields to swing the child seat 100 forward. This has produced the problem that greater movement of the child's head can hinder sufficient safety being secured.

In view of this, methods have been proposed such that a hard pad or metal cross member 112 is in the front portion of the seat cushion 101 as shown in FIG. 38A, that support legs 113 are arranged between the front bottom portion of the child seat 100 and the floor surface of the cabin as shown in FIG. 38B, and that the rear top portion of the child seat 100 and a hook 114 arranged on the body side are coupled with a coupling member 115 as shown in FIG. 38C. Nevertheless, the method of FIG. 38A has a problem of poorer seating comfort under normal riding conditions. The methods of FIGS. 38B and 38C have a problem of poorer workability in mounting the child seat 100. The method of FIG. 38B in particular has the problem that floor vibrations can be transmitted to the child seat 100 with a deterioration in the riding comfort of the child.

It is thus an object of the present invention to provide a car seat which solves the conventional problems mentioned above and surely suppress the forward movement of the passenger in case of an abrupt vehicle deceleration without deteriorating the seating comfort, yet having a simple low-cost configuration.

Another object is to provide a car seat which provides the foregoing effect irrespective of the seating position or body size of the passenger.

Another object is to provide a car seat which prevents a forward swing of a child seat to secure child's safety sufficiently when the child seat is installed by employing the fixing method of ISO system.

DISCLOSURE OF THE INVENTION

A car seat of the present invention comprises: a catch part arranged inside a front portion of a seat cushion so as to be vertically movable, extending in a width direction of the seat cushion; means for urging the catch part to move upward; and lock means for operating with an inertial force upon an abrupt deceleration to inhibit vertical movement of the catch part. According to this configuration, when a passenger sits on the seat cushion, a pressing force acts on the catch part from above. Then, the catch part moves down easily so that a sense of foreign object is relieved to preclude deterioration in seating comfort. Upon an abrupt deceleration due to a frontal crash, the inertial force activates the lock means to inhibit the downward movement of the catch part. The passenger's rear end, even if starting to move forward, is thus caught by this catch member so that the forward movement of the passenger is reliably suppressed. In addition, the absence of provision of additional push-up mechanisms or driving means simplifies the configuration, allowing lightweight low-cost configuration.

Moreover, the catch part is supported by a strength member inside the seat cushion via a spindle so as to be vertically swingable. Urging means is arranged around the spindle. Consequently, a support mechanism for allowing vertical movement of the catch part is configured compactly.

Moreover, the lock means comprises a pendulum member having a mesh engaging part for the catch part, the pendulum member being mounted on a strength member so as to be swingable back and forth, the catch member being pivotally supported by the strength member. Consequently, it is possible to constitute the lock means by a compact swing mechanism and to suppress rattles in operation for sure locking.

Moreover, urging means is provided for urging the pendulum member opposite to a direction for engagement with the catch part. Consequently, an accidental lock in normal use is surely precluded to secure seating comfort.

Moreover, the lock means comprises a lock member having a mesh engaging part for the catch part, the lock member being mounted on a strength member so as to be slidable obliquely upward, the catch part being supported by the strength member. Consequently, as compared to the case where the pendulum member is provided, the small-sized simple configuration allows reductions in weight and cost. In addition, since compact arrangement in the space under the swing arm is possible, the flexibility of mounting onto the seat cushion is increased.

Moreover, the seat cushion has a structure in which a spring receiver part, such as an S spring, and the catch part are arranged under a cushion pad. A plurality of spring receiver parts and the catch part are arranged front to back at appropriate intervals in parallel, with the catch part in the front row. Consequently, the catch part also exercises the same function as that of a spring receiver part so that the entire rear end of the passenger is supported with comfortable cushioning. Besides, the urging force on the catch part is increased in accordance with the spring receiver parts. The catch part is located at a higher position, and the spring receiver parts extend to allow a larger downward movement of the passenger. Thus, the function of suppressing the forward movement of the passenger is obtained with higher reliability. Incidentally, aside from S springs, the spring receiver parts may use wires and nets having springness.

Moreover, the lock means comprises a ratchet mechanism for inhibiting downward movement of the catch part and allowing upward movement thereof. Consequently, when the lock means is activated with an inertial force, and the downward movement of the catch part is inhibited surely and an upward component force resulting from the forward movement of the passenger's rear end acts on the catch part, or when an additional push-up force is exerted upward, the catch part moves upward so that the forward movement of the passenger is surely caught by this catch member.

Moreover, auxiliary means is provided for moving the catch part upward based on inertial movement of a passenger upon an abrupt deceleration. Consequently, since the catch part is actively moved upward based on the movement of the passenger, the forward movement of the passenger is surely caught by the catch part. When combined with the lock means having the ratchet mechanism in particular, the catch member is moved still upward even when the lock means operates in advance. Thus, the forward movement of the passenger is suppressed with even higher reliability, irrespective of the operating timing of the lock means and the auxiliary means.

Moreover, the catch part comprises a catch member extending in the width direction of the seat cushion and a pair of swing arms rotatably supported by a spindle, both ends of the catch member being fixed to either ends of the swing arms. The swing arms are each composed of two members coupled so as to be rotatable between the spindle and the catch member when under a predetermined load. Consequently, even if the height position of the catch member at the point of action of an abrupt deceleration is not much higher than that of the spindle because of the passenger's seating position or body size, the members of the swing arms closer to the catch member rotate upward when the catch member undergoes a predetermined or higher load from behind due to the start of the forward movement of the passenger's rear end. This moves the catch member upward and thus the load acting on the catch member causes a component force for lifting the catch member upward, so that the swing arms swing upward to lift the catch member further. Thus, the forward movement of the passenger is suppressed with reliability. In addition, the absence of provision of additional push-up mechanisms or driving means simplifies the configuration, allowing lightweight low-cost configuration.

Moreover, a holding member on which the catch member, the urging means, and the lock means are mounted is supported at a position below the spindle so as to be swingable back and forth. Means for urging the catch member backward are provided. Consequently, even if the height position of the catch member at the point of action of an abrupt deceleration is not much higher than that of the spindle because of the passenger's seating position or body size, the holding member swings forward against the urging force of the urging means to move the catch member upward when the catch member undergoes a predetermined or higher load from behind due to the start of the forward movement of the passenger's rear end. The load acting on the catch member thus causes a component force for lifting the catch member upward, and the swing arms swing upward to lift the catch member further. Thus, as is the case with the foregoing, the forward movement of the passenger is suppressed with reliability.

Moreover, a car seat is provided which comprises a catch member arranged in a seat cushion so as to prevent the waist of a passenger from slipping forward upon an abrupt deceleration, the catch member extending in the width direction of the seat cushion, wherein the catch member has at least two bend inducing portions except at its center in the width direction of the catch member. Consequently, downward bends occur at two or more points on both sides of the center. As compared to the case of a single bend at the center, the distributed stress precludes a large downward bend, thereby making it hard for the pelvis at the rear end to slip. The effect of absorbing the impact energy also increases to ensure the effect of suppressing the forward movement of the passenger.

Moreover, A car seat is provided which comprises a catch member arranged in a seat cushion so as to prevent a rear end of a passenger from slipping forward upon an abrupt deceleration, the catch member extending in the width direction of the seat cushion and being lifted up in front upon an abrupt deceleration, wherein the catch member is provided with means having rigidity against an impact input from the passenger in the process of being lifted up in front, the means being deformed by an impact input from the passenger when lifted up. This precludes large deformation of the catch member when an impact load is input obliquely downward upon an abrupt deceleration. Then, the catch member is lifted up by the action of the input load, and the passenger's rear end is surely caught by the catch member and in that state the catch member is deformed forward to absorb the impact energy. Thus, the forward movement of the passenger is suppressed with reliability.

Moreover, in the car seat of each of the foregoing configurations, an anchor for fixing a child seat is arranged to lie near a position between a rear end of the seat cushion and a bottom end of a seat back and is fixed to a frame. A to-be-locked portion arranged on a rear bottom end of the child seat is locked to the anchor. Consequently, when an abrupt deceleration occurs with the child seat mounted, the catch part is locked so as not to move downward and the front portion of the child seat is supported by this catch part. The child seat is thus surely prevented from swinging forward about the engaging point between the to-be-locked portion and the anchor, so that the safety of the child on the child seat is secured.

Moreover, lock operation means is provided for switching the lock means between a locked state and an unlocked state. When a child seat is mounted, the lock operation means is operated to establish a locked state so that the operation of the lock means will not delay upon an abrupt deceleration. The forward swing of the child seat can thus be prevented with higher reliability, whereby the safety of the child on the child seat can be secured yet more sufficiently.

BRIEF DESCRIPTION OF THE DRAWINGS

FIG. 22A is a side view showing an essential configuration of a seventh embodiment of the car seat of the present invention, and FIG. 22B is a sectional front view taken along the line XXIIB—XXIIB of FIG. 22A;

FIG. 30B is a side view showing the essential configuration of the embodiment in a locked state;

FIGS. 34A to 34C are explanatory diagrams showing the behavior of a passenger on a car seat upon an abrupt deceleration;

BEST MODE FOR CARRYING OUT THE INVENTION

Hereinafter, a first embodiment of the car seat of the present invention will be described with reference to FIGS. 1 to 5.

Figure 1:
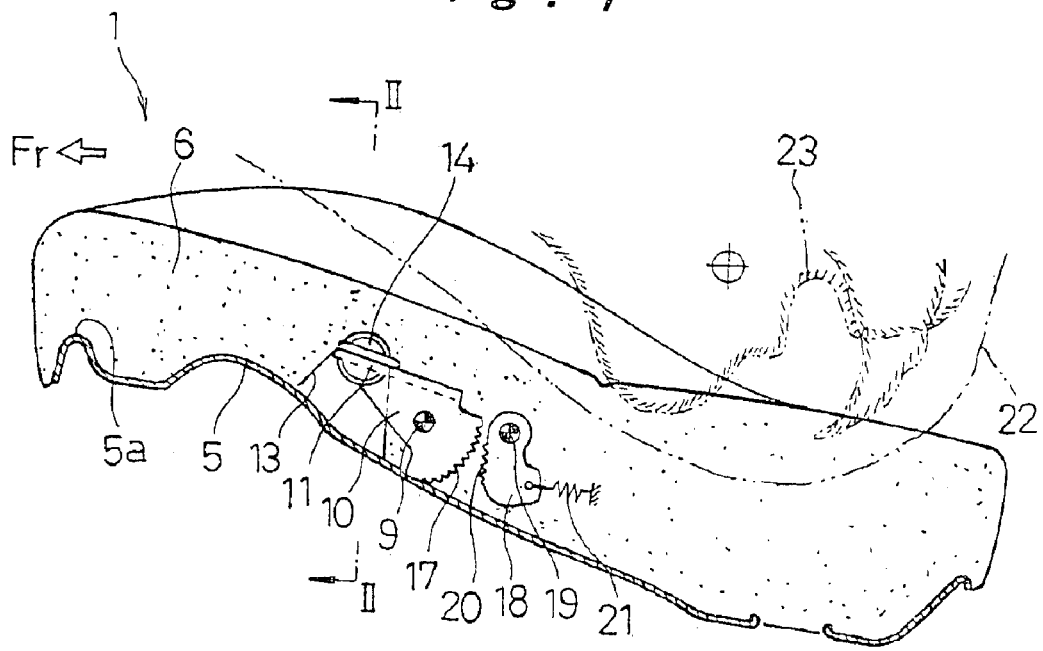
FIG. 1 is a longitudinal sectional side view of a first embodiment of a car seat of the present invention.
Figure 2:
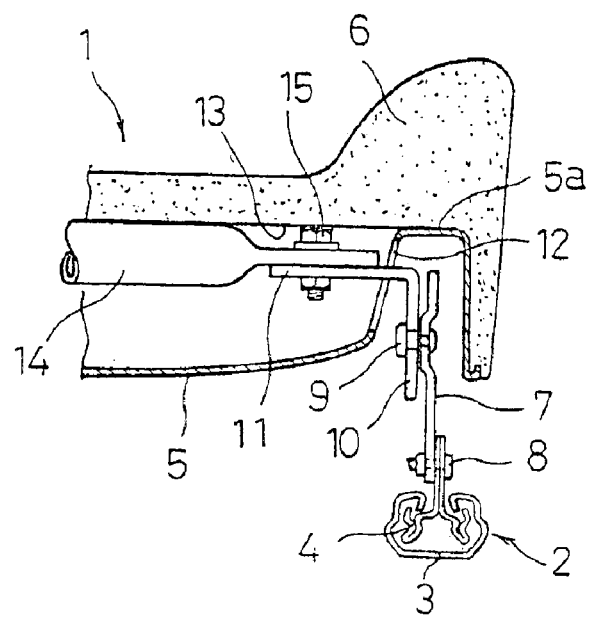
FIG. 2 is a fragmentary longitudinal sectional front view taken along the line II—II of FIG. 1.
Figure 3:
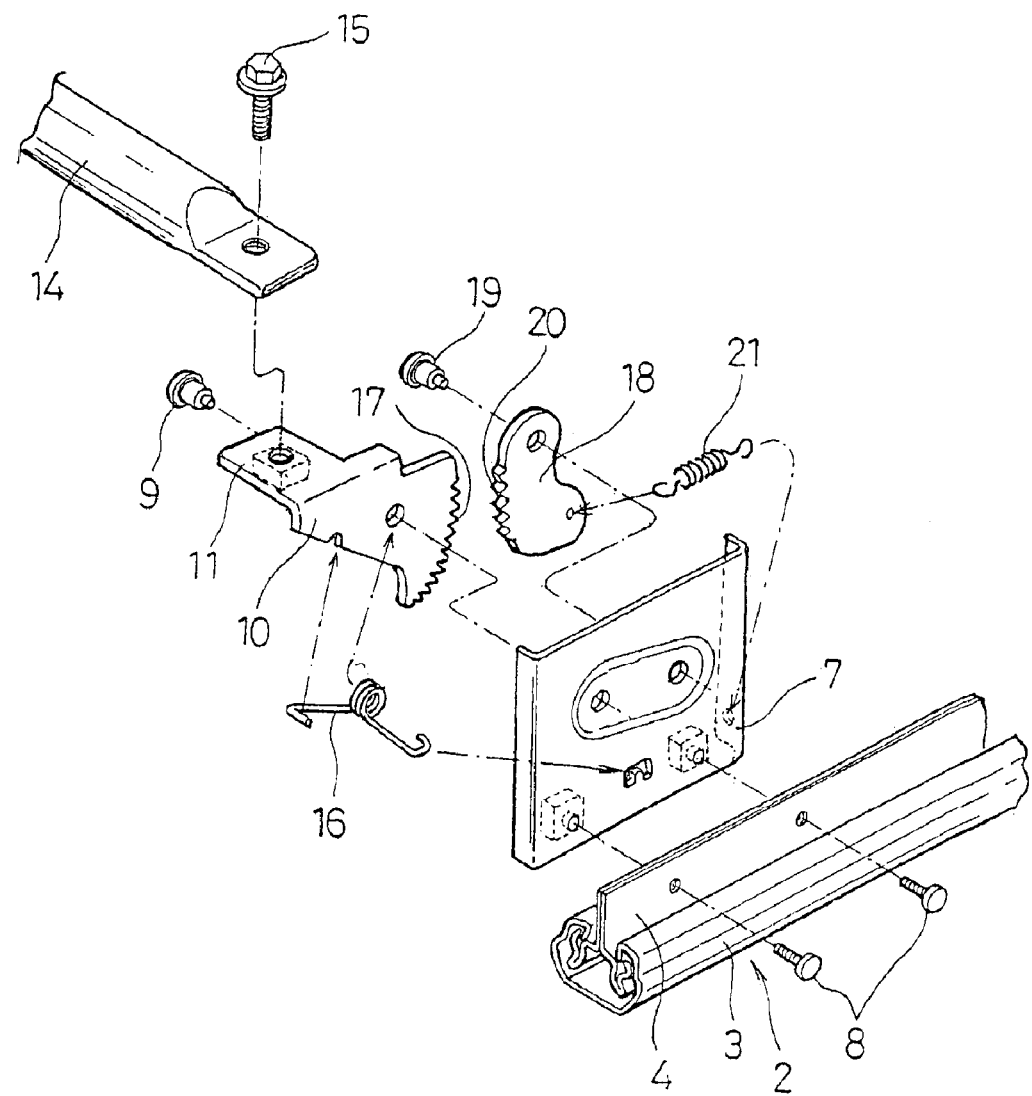
FIG. 3 is an exploded perspective view of a catch part and lock means of the embodiment.

In FIGS. 1 to 3, 1 designates a seat cushion of the car seat, which is attached onto a floor so as to be adjustable in position back and forth by means of seat rails 2 on both right and left sides. The seat rails 2 each have an upper rail 4 which is mounted on a lower rail 3 so as to be slidable and fixable in an arbitrary position, the lower rail 3 being fixed to the floor of the car body. Designated by 5 is a steel-plate frame unit of the seat cushion 1, which is mounted on the upper rails 4 of the right and left seat rails 2 at both sides of its bottom. A cushion pad 6 made of urethane foam or the like is mounted on the top of this frame unit 5. The external surface is further covered with an exterior member (not shown). A peripheral bank part 5a bulged upward is arranged on the outer periphery of the frame unit 5. The cushion pad 6 is formed to fit to the inner and outer peripheral surfaces thereof.

Support brackets 7 erected in a space between the inner and outer walls of the peripheral bank part 5a of the frame unit 5 are fixed to the front portions of the right and left upper rails 4 with mounting bolts 8. Swing arms 10 are pivotally supported at their center portions on the support brackets 7 via spindle pins 9 so as to be swingable vertically. The front ends of the swing arms 10 are provided with mounting tabs 11 which are bent in an L shape toward the inside of the seat cushion 1. These mounting tabs 11 are extended into the space surrounded by the peripheral bank part 5a, passing through notch openings 12 made in the inner walls of the peripheral bank part 5a of the frame unit 5. The cushion pad 6 is also provided with an open-bottom groove 13 across the right and left notch openings 12, 12 of the peripheral bank part 5a.

A catch member 14 made of a pipe member is laid across the mounting tabs 11, 11 of the right and left swing arms 10, with both ends thereof fastened and fixed by fastening bolts 15. These swing arms 10 and catch member 14 constitute a catch part. The catch member 14 is thereby supported so as to be vertically movable in the front portion of the inside of the seat cushion 1. Moreover, torsion springs 16 are arranged around the spindle pins 9 and are engaged with the swing arms 10 at either ends thereof and with the support bracket 7 at the other ends, thereby urging the catch member 14 to swing upward.

The highest position of the catch member 14 is controlled by the catch member 14 coming into engagement with the top of the groove 13 in the cushion pad 6 so that downward displacement of the cushion pad 6 is transmitted directly to the catch member 14 and the occurrence of strange sound at the highest position is precluded.

The rear edges of the swing arms 10 are shaped into arc surfaces about the shaft axes of the spindle pins 9. The arc surfaces are provided with engaging tooth trains 17. Pendulum members 18 are swingably attached to positions an appropriate distance behind the pivotal support points of the swing arms 10 on the support brackets 7, by means of pivotal support pins 19. The front edges of the pendulum members 18 are provided with meshing teeth 20 for meshing with the engaging tooth trains 17 when swung forward. Extension springs 21 for urging the pendulum members 18 backward are interposed between the rear portions of the pendulum members 18 and the rear ends of the support brackets 7.

Incidentally, in FIG. 1, 22 designates the rear end of a passenger who is sitting on the seat cushion 1, and 23 the pelvis thereof.

Figure 4:
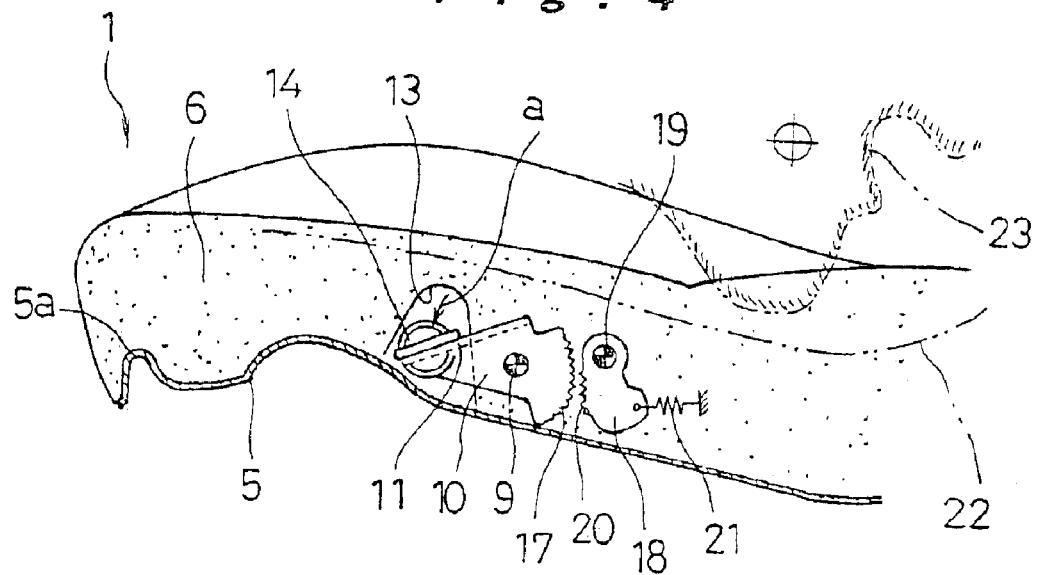
FIG. 4 is a longitudinal sectional side view showing the state of operation of the catch part of the embodiment under normal conditions.

According to the foregoing configuration, when a passenger sits on the seat cushion 1 of the car seat or when the passenger operates pedals, the cushion pad 6 makes downward displacement while being compressed. Here, the pendulum members 18 make no forward swing since they are urged to move backward by the urging forces of the extension springs 21. Thus, as shown in FIG. 4, the catch member 14 is pressed down and the swing arms 10 easily swing downward against the urging forces of the torsion springs 16. The catch member 14 makes a smooth downward movement as indicated with the arrow a, thereby avoiding a sense of discomfort to the passenger and deterioration in the seating comfort.

Moreover, since the pendulum members 18 are urged to move backward by the extension springs 21 as described above, there is no possibility that the downward movement of the catch member 14 is inhibited accidentally to deteriorate the seating comfort in normal use.

Figure 5:
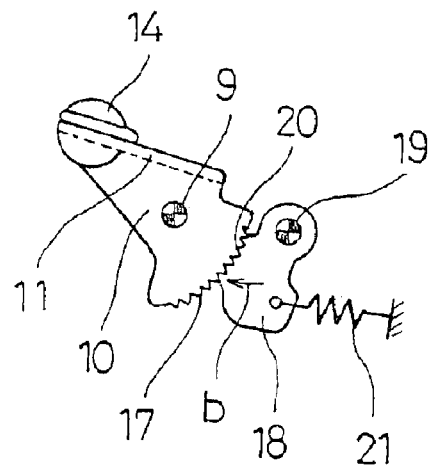
FIG. 5 is a side view showing the state of operation of the lock means of the embodiment upon an abrupt deceleration.

On the other hand, when the car encounters a frontal crash to cause an abrupt deceleration, as shown in FIG. 5, the pendulum members 18 inertially swing forward about the pivotal support pins 19 against the urging forces as indicated by the arrow b, and the meshing teeth 20 on the front edges mesh with the engaging tooth trains 17 on the rear edges of the swing arms 10. This locks the swings of the swing arms 10 so that the downward movement of the catch member 14 is inhibited to maintain the state of FIG. 1. In addition, since the pendulum members 18 thus supported swingably are used as the lock means, it is possible to achieve a compact configuration and suppress rattles in operation for sure locking.

Consequently, when an abrupt deceleration occurs in the state of FIG. 1 to enter the locked state of FIG. 5 and in that state the passenger's rear end 22, starts to move forward, the rear end 22 is surely caught by the catch member 14. Hence, the forward movement of the passenger is surely avoided by the catch member 14. Besides, elastic deformation of the catch member 14 absorbs the energy of forward movement of the passenger, thereby suppressing the amount of forward movement.

Moreover, the foregoing configuration does not contain any additional push-up mechanisms or driving means as in the conventional example. Thus, this simple configuration is constituted with lightweight at low cost.

Now, a second embodiment of the car seat of the present invention will be described with reference to FIGS. 6 to 8. Incidentally, in the description of the following embodiments, the same components as in the preceding embodiment(s) will be designated by identical reference numerals and description thereof will be omitted. Description will be given of differences alone.

In the present embodiment, the frame unit 5 is supported by the support brackets 7. These support brackets 7 are each provided with a pair of holding plates 24a and 24b for swingably sandwiching and holding a swing arm 10 and a pendulum member 18 which constitute the catch part, with spacers 24c interposed therebetween. In FIG. 8, designated by 5b and 5c are fixing bolts and nuts for fastening and fixing the frame unit 5 to the supporting brackets 7. The pair of holding plates 24a and 24b are fastened and fixed to a support bracket 7 with three pins, or a spindle pin 9, a pivotal support pin 19, and an mounting pin 25 which are threaded pins having screw threads on both ends. Designated by 9a, 9b, 19a, 19b, 25a, and 25b are respective fastening nuts.

The swing arms 10 are swingably supported at their center portions by the spindle pins 9 in such a slanting position that the mounting tabs 11 for mounting the catch member 14 lie above behind and the engaging tooth trains 17 below in front. The pendulum members 18 are arranged in front of the swing arms 10 and swingably supported at their center portions by the pivotal support pins 19 in such a slating position that the meshing teeth 20 lie below behind and the plumb parts up in front. The pendulum members 18 are normally urged backward by the extension springs 21 which are laid across the top portions of the plumb parts and the rear portions of the holding plates 24b. Then, the pendulum members 18 are configured so that upon an abrupt deceleration, their plumb parts inertially move forward to swing the meshing teeth 20 backward, making engagement with the engaging tooth trains 17 of the swing arms 10 to inhibit downward movement of the catch member 14.

Figure 6:
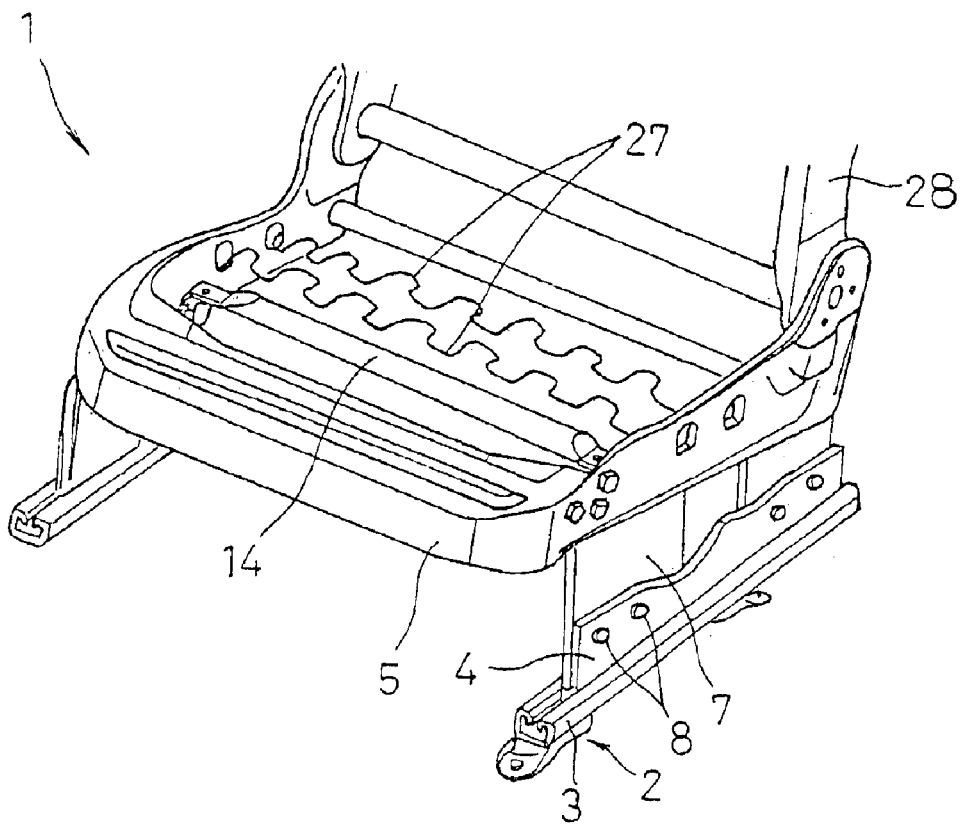
FIG. 6 is a perspective view of a second embodiment of the car seat of the present invention with a pad member removed.
Figure 7:
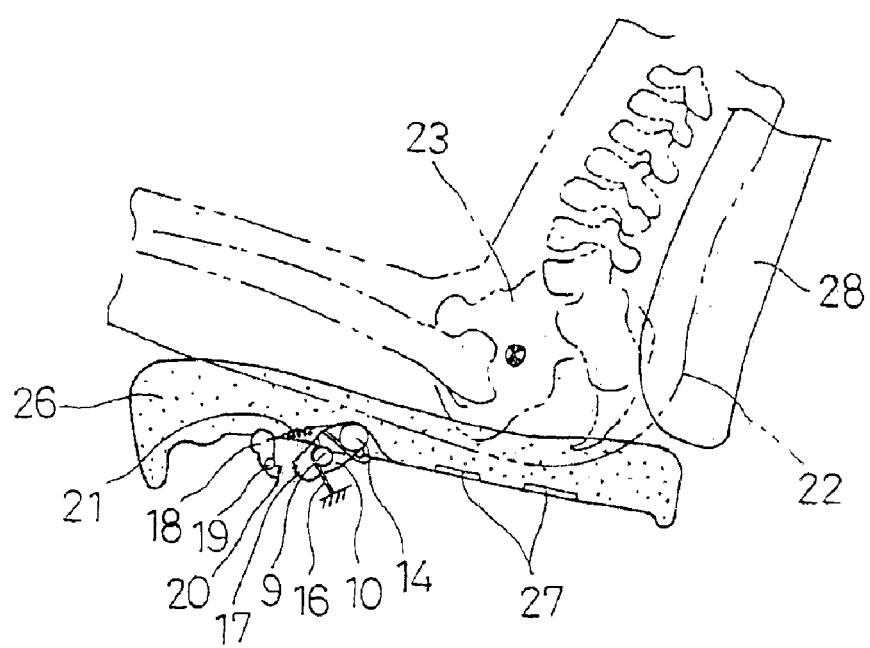
FIG. 7 is a longitudinal sectional side view of an essential configuration of the embodiment.
Figure 8:
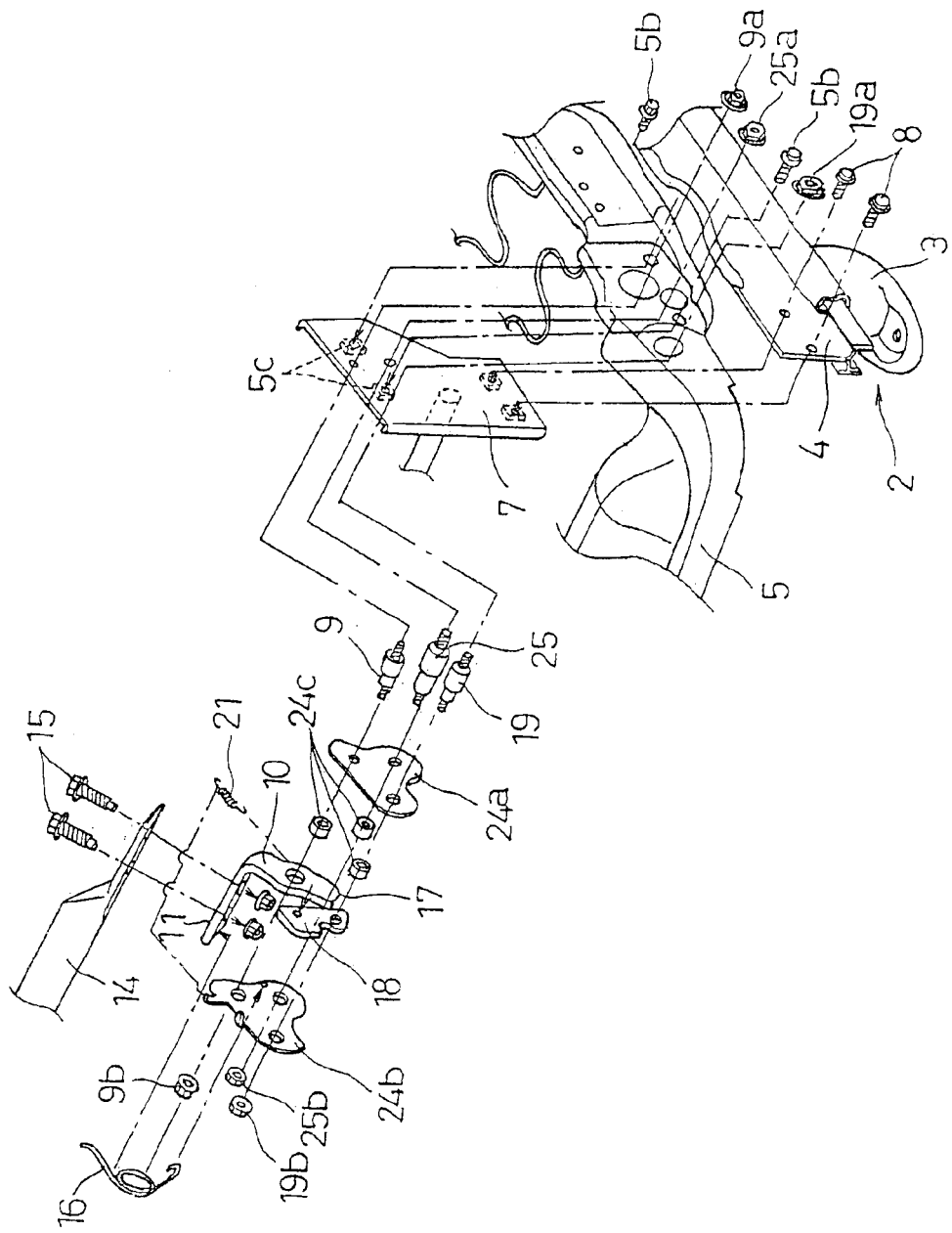
FIG. 8 is an exploded perspective view of the catch part and lock means of the embodiment.

As shown in FIGS. 6 and 7, the frame unit 5 has a layout space of a relatively thin cushion pad 26 in its top. For the sake of supporting this cushion pad 26, a catch part having the catch member 14 of the foregoing configuration and a plurality (two, in the shown example) of S springs 27 functioning as spring receiver parts are thereunder arranged front to back at appropriate intervals in parallel, with the catch part in the front row. Designated by 28 is a seat back which is coupled to the rear end of the frame unit 5 so as to be swingable back and forth.

According to the foregoing configuration, the catch part having the catch member 14 provides the same function as that of the S springs 27. Since these catch part and S springs 27 support the passenger's rear end 22 via the relatively thin cushion pad 26, the entire rear end 22 of the passenger is supported with comfortable cushioning. Moreover, the upward urging forces of the torsion springs 16 on the catch member 14 is increased in accordance with the S springs 27. Besides, the catch member 14 can be located in a higher position and the S springs 27 extends to allow large downward movement of the passenger's rear end 22. Thus, the function for suppressing the forward movement of the passenger's rear end 22 is also obtained with higher reliability.

Furthermore, in the present embodiment, when the passenger's rear end 22 starts to move forward upon an abrupt deceleration and the catch member 14 undergoes a forward force from behind, there arises a component force that swings the catch member 14 upward. Thus, the forward movement of the passenger's rear end 22 is suppressed by the catch member 14 with yet higher reliability.

Figure 9:
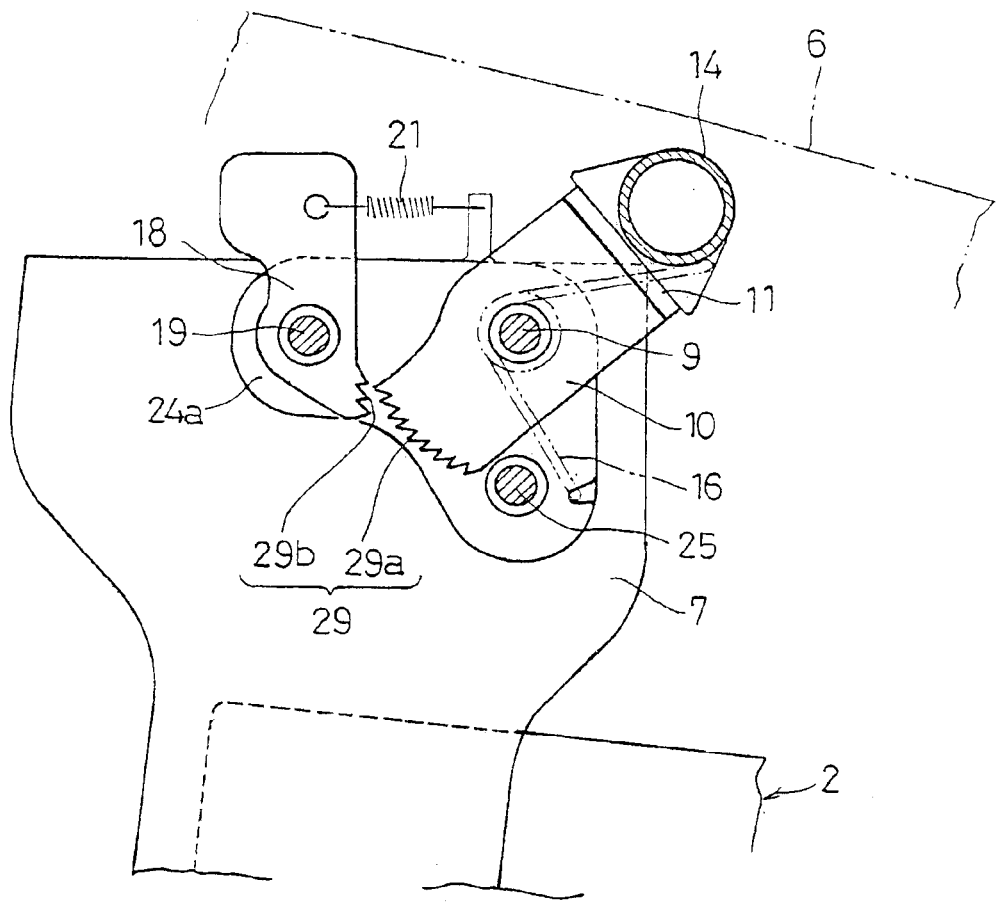
FIG. 9 is a longitudinal sectional side view of a modified configuration example of the catch part and lock means of the embodiment.

FIG. 9 shows a modified configuration example of the present embodiment. In this modified configuration example, ratchet teeth 29a and ratchet pawls 29b are formed instead of the engaging tooth trains 17 of the swing arms 10 and the meshing teeth 20 of the pendulum members 18, respectively. This constitutes ratchet mechanisms 29 for inhibiting the downward movement of the catch member 14 and allowing the upward movement thereof.

As above, the ratchet mechanisms 29 are interposed between the swing arms 10 and the pendulum members 18. On this account, when the catch member 14 undergoes a forward force from behind because of the passenger's rear end 22 upon an abrupt deceleration as described above and there occurs a component force for swinging the catch member 14 upward, the catch member 14 is allowed to swing upward even if the pendulum members 18 swing in advance and the ratchet teeth 29a are engaged with the ratchet pawls 29b. Thus, the catch member 14 moving upward suppresses the forward movement of the passenger's rear end 22 with higher reliability.

Figure 10:
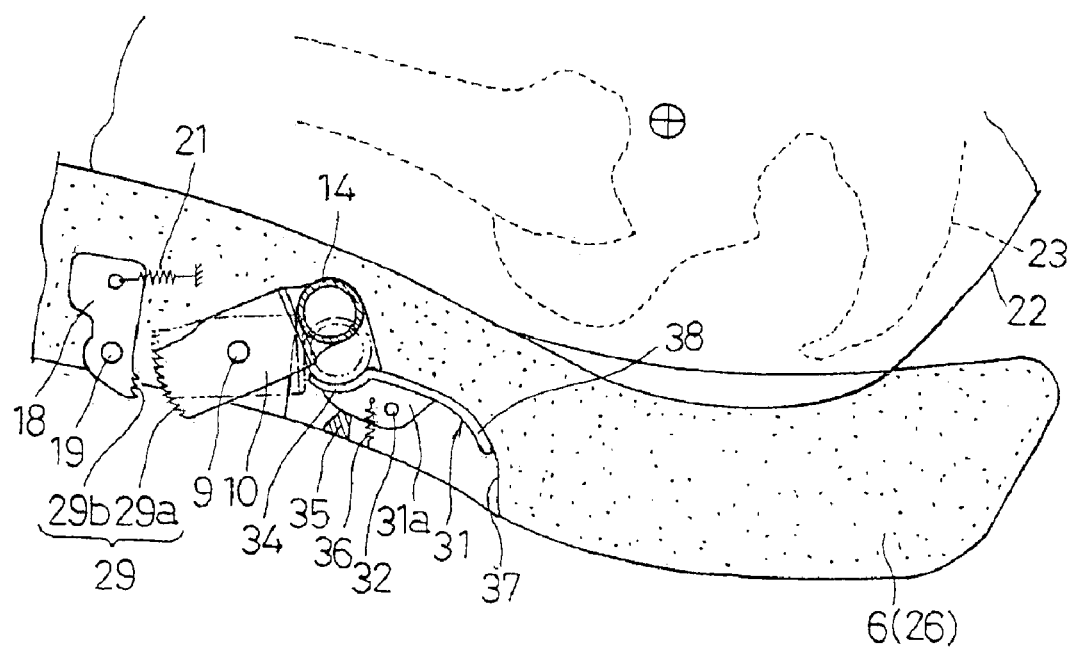
FIG. 10 is a longitudinal sectional side view of a third embodiment of the car seat of the present invention.
Figure 11:
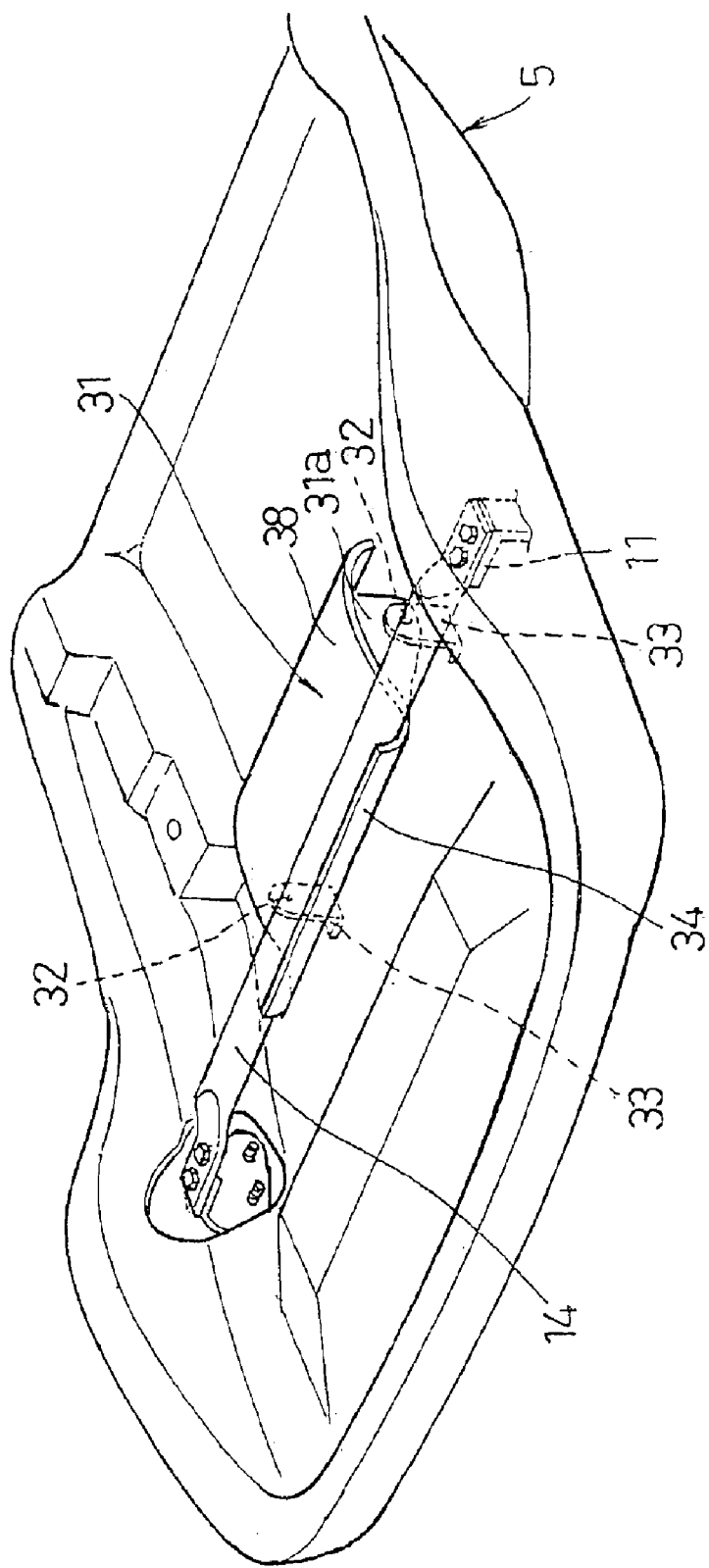
FIG. 11 is a perspective view of the embodiment with a pad member removed.

Now, a third embodiment of the car seat of the present invention will be described with reference to FIGS. 10 to 12.

In the present embodiment, an auxiliary plate 31 is arranged as auxiliary means in a position behind the catch member 14 of the car seat having the configuration shown in FIG. 9. The auxiliary plate 31 has support tabs 31a extended down from both sides of its center portion in the front-to-back direction. The auxiliary plate 31 is vertically swingably supported via pivotal support pins 32 on pivotal support brackets 33 which are fixed onto the frame unit 5. The front end of the auxiliary plate 31 is provided with a push-up engaging part 34 which comes into engagement with and push up the lower end of the catch member 14. There are also provided a stopper 35 for controlling the lower end of swing of this push-up engaging part 34 and extension springs 36 for urging downward swing. The auxiliary plate 31 is arranged inside an auxiliary plate layout recess 37 which is made in the cushion pad 6 or 26. It is configured so that a rear receiver plate portion 38 comes near contact with the ceiling surface of the auxiliary plate layout recess 37 when the push-up engaging part 32 is in contact with the stopper 35.

Figure 12:
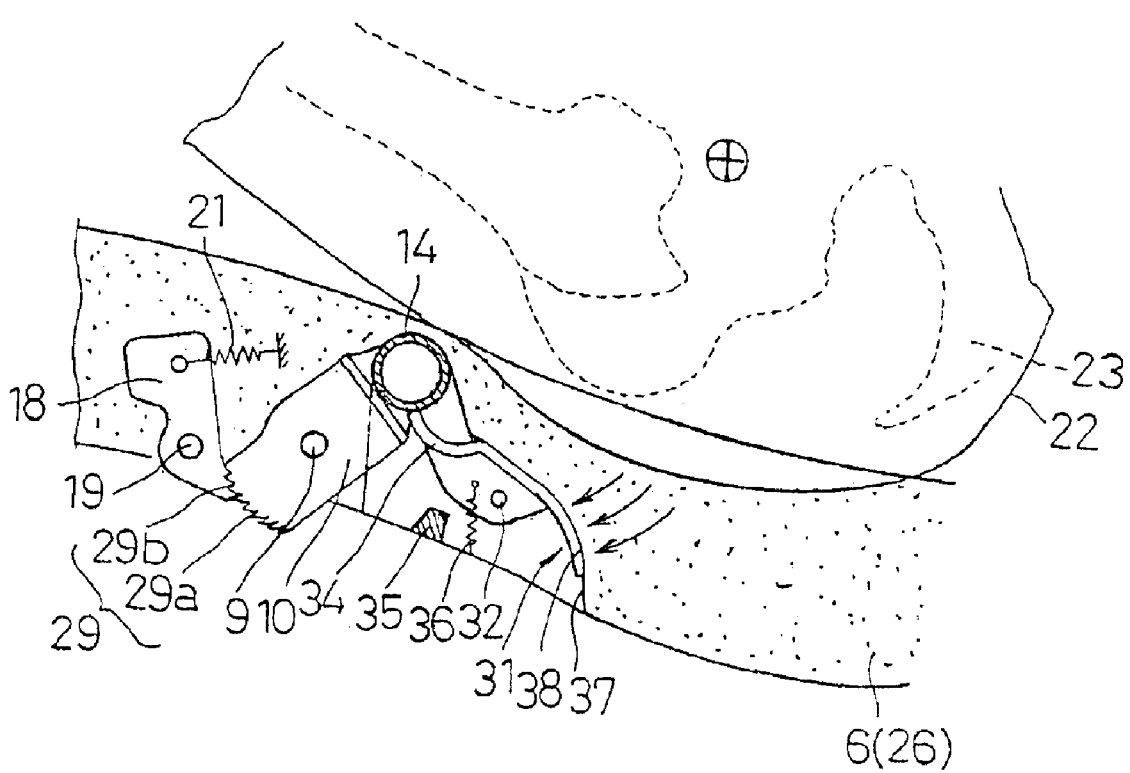
FIG. 12 is a longitudinal sectional side view showing the state of operation of the lock means of the embodiment upon an abrupt deceleration.

According to the foregoing configuration, when an abrupt deceleration occurs due to frontal crash or the like, the passenger's rear end 22 inertially sinks into the seat cushion 1 and moves forward as well, pushing down the cushion pad 6 or 26 while moving forward as shown in FIG. 12. The receiver plate portion 38 of the auxiliary plate 31 is thus pushed down by the rear end 22 as indicated by the arrows, whereby the push-up engaging part 34 is swung upward to push up the catch member 14. As above, since the catch member 14 is actively moved upward based on the movement of the passenger's rear end 22, the forward movement of the passenger is surely caught by the catch member 14. Furthermore, depending on the design of the auxiliary plate 31, the height position of the catch member 14 lifted upon an abrupt deceleration is made even higher than the height position under no load. This allows more effective suppression of the passenger's forward movement.

Now, at the time of this abrupt deceleration, the foregoing operation takes place as is if the receiver plate portion 38 of the auxiliary plate 31 is pushed down as described above before the pendulum members 18 operate and come into engagement with the swing arms 10. When the pendulum members 18 operate in advance and the meshing teeth 20 of the pendulum members 18 are engaged with the engaging teeth trains 17 of the swing arms 10, the catch member 14 is engaged in the height position at that time. In the present embodiment, the engaging parts between the swing arms 10 and the pendulum members 18 are made of the ratchet mechanisms 29, so that the catch member 14 is moved further upward as described above. Thus, the forward movement of the passenger's rear end 22 is surely caught by the catch member 14.

Besides, in the present embodiment, the auxiliary plate 31 supports the load of the passenger, producing a braking effect on the inertial force acting on the passenger. Followed by the catch by the catch member 14, it is thus possible to provide the effect of absorbing the forward movement energy of the passenger in two steps. When the shape of the auxiliary plate 31 and the urging forces of the extension springs 36 are optimized, the auxiliary plate 31 is also applied as a spring support structure for improving the seating comfort of the seat cushion 1.

Now, a fourth embodiment of the car seat of the present invention will be described with reference to FIGS. 13A to 13C and FIG. 14.

Figure 13A:
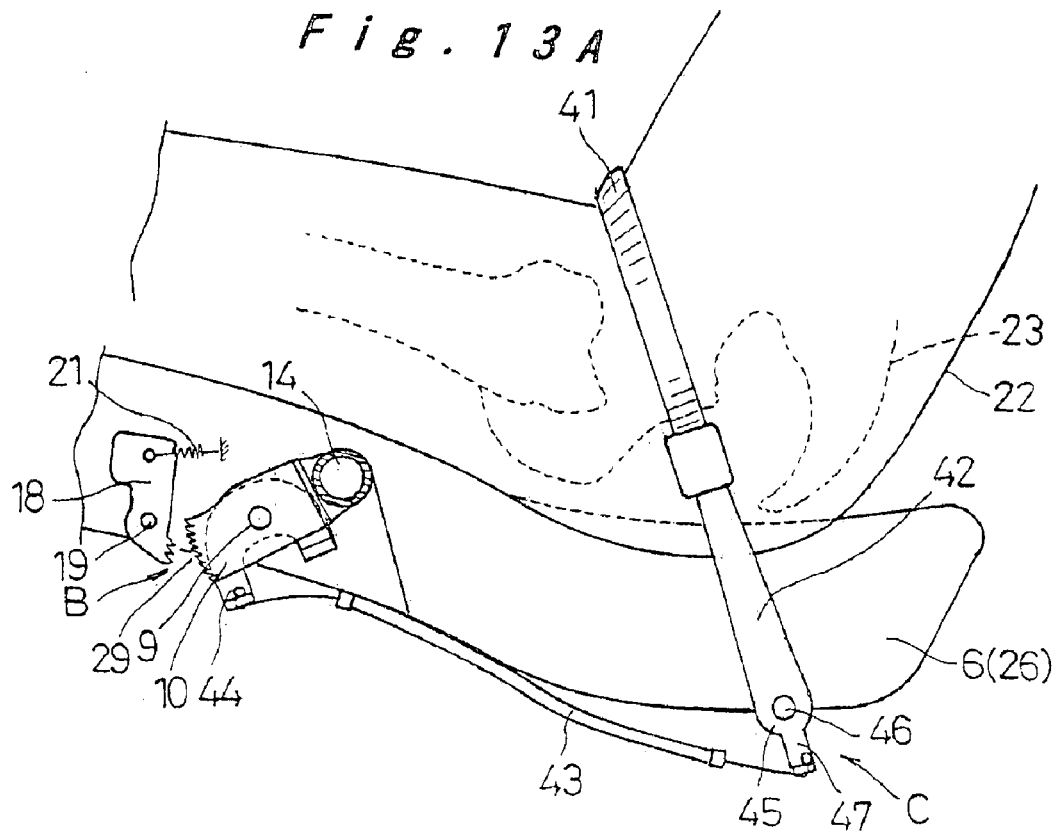
FIG. 13A is a longitudinal sectional side view of an essential configuration of a fourth embodiment of the car seat of the present invention.
Figure 13B:
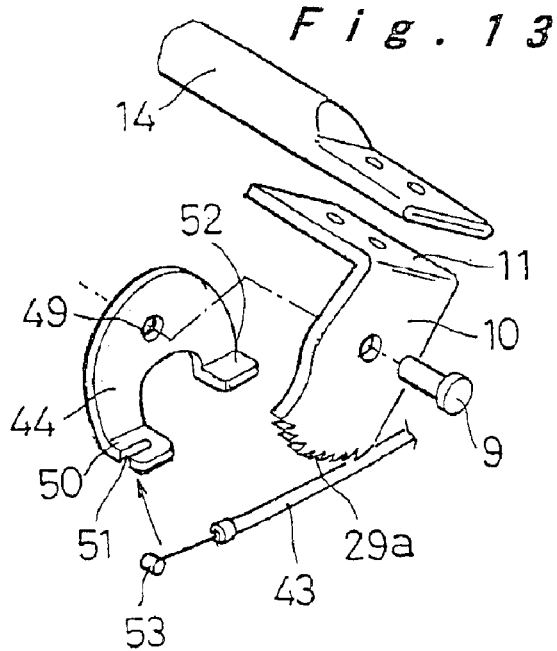
FIG. 13B is a detailed exploded perspective view of the portion B of FIG. 13A.
Figure 13C:
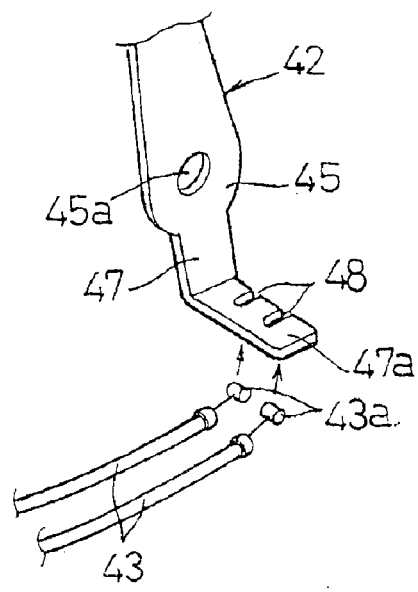
FIG. 13C is a detailed exploded perspective view of the portion C of FIG. 13A.

In the present embodiment, as a substitute for the auxiliary plate 31 of the foregoing third embodiment, an inner belt stay 42 for being engaged with and fixing the inner side end of a seat belt 41 and lifting brackets 44 capable of lifting an engaging member 14 are coupled via wire cables 43 as shown in FIGS. 13A to 13C. With the forward movement of the rear end 22 upon an abrupt deceleration, as shown in FIG. 14, the seat belt 41 is pulled forward to cause forward rotation of the inner belt stay 43, which rotates the lifting brackets 44 to lift the engaging member 14.

Description will be given of the concrete configuration. The inner belt stay 42 is supported so as to be swingable back and forth by a pivotal support shaft 46 being fit into a shaft hole 45a made in a pivotal support portion 45 on its bottom end. An operation arm 47 is extended down from the pivotal support portion 45, and a pair of lock grooves 48 are formed in a coupling portion 47a which is L-bent from the bottom of the operation arm 47. Locking pieces 43a on either ends of a pair of wire cables 43 are locked on the respective lock grooves 48. The pair of wire cables 43 are coupled to the lifting brackets 44 which are arranged on both ends of the catch member 14, respectively. The lifting brackets 44 are swingably supported, along with the swing arms 10, by the spindle pins 9 being passed through shaft holes 49 made in their center portions. Coupling portions 50 formed by bending the bottom ends of these lifting brackets 44 into an L shape have lock grooves 51, to which locking pieces 43a on the other ends of the wire cables 43 are locked. The rear edges of the top ends of these lifting brackets 44 have engaging tabs 52 to be engaged with the top rear edges of the swing arms 10.

Figure 14:
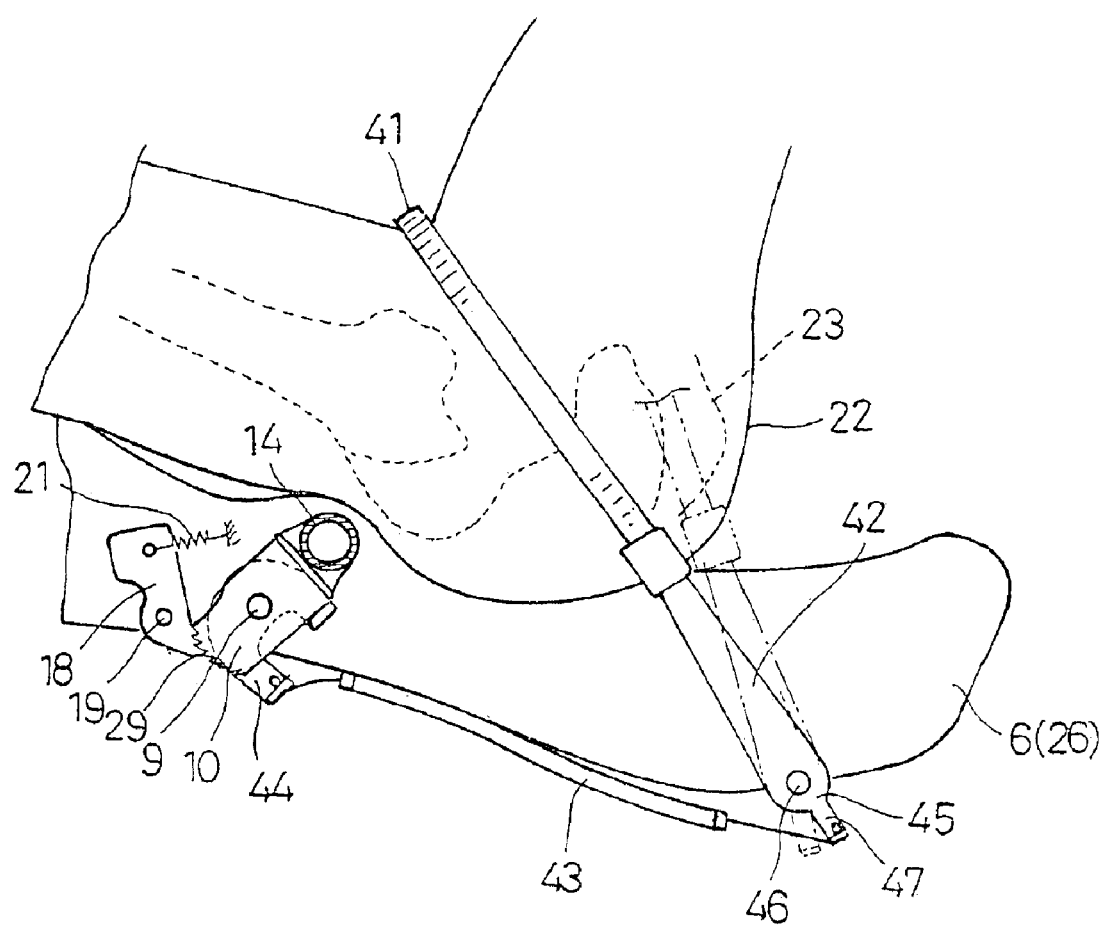
FIG. 14 is a longitudinal sectional side view showing the state of operation of the lock means of the embodiment upon an abrupt deceleration.

According to the foregoing configuration, as shown in FIG. 14, when an abrupt deceleration occurs from a frontal crash or the like and the passenger's rear end 22 inertially moves forward, the inner belt stay 42 swings forward from the state shown by the virtual lines. The operation arm 47 swings backward accordingly to pull the wire cables 43 backward, and the bottom ends of the lifting brackets 44 swing backward so that the engaging tabs 52 swing the rear portions of the swing arms 10 upward to push up the catch member 14. Consequently, since the catch member 14 is actively moved upward based on the movement of the passenger's rear end 22, the forward movement of the passenger is surely caught by the catch member 14.

Now, a fifth embodiment of the car seat of the present invention will be described with reference to FIGS. 15A to 19.

Figure 15A:
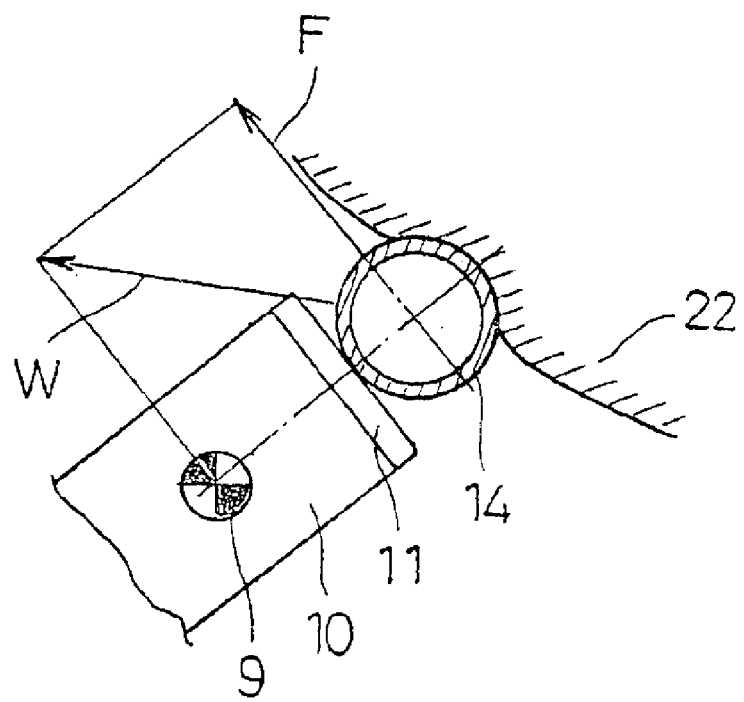
FIGS. 15A and 15B are explanatory diagrams showing a problem with the car seats of the foregoing embodiments.
Figure 15B:
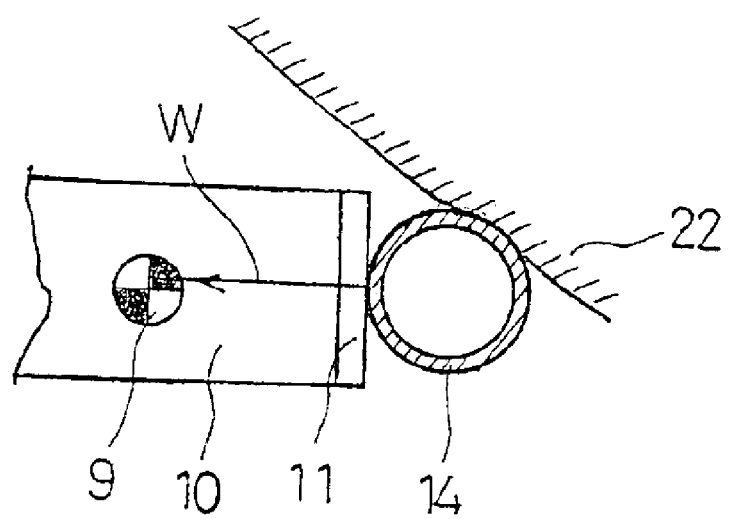

In the car seats of the foregoing embodiments, if the height position of the catch member 14 at the time of action of an abrupt deceleration is above the spindle pins 9 as shown in FIG. 15A, a component force F for lifting the catch member 14 upward occurs when the passenger's rear end 24 starts to move forward to apply a forward load W to the catch member 14. The catch member 14 is lifted further to suppress the forward movement of the passenger with higher reliability. Depending on the seating position or body size of the passenger, however, there is a possibility that the height position of the catch member 14 at the time of action of an abrupt deceleration is not much above the spindle pins 9 as shown in FIG. 15B. In that case, the component force for lifting the catch member 14 will not occur and the catch member 14 will not be lifted up, with the problem that the forward movement of the passenger due to an abrupt deceleration on a frontal crash cannot be suppressed with reliability.

Figure 16:
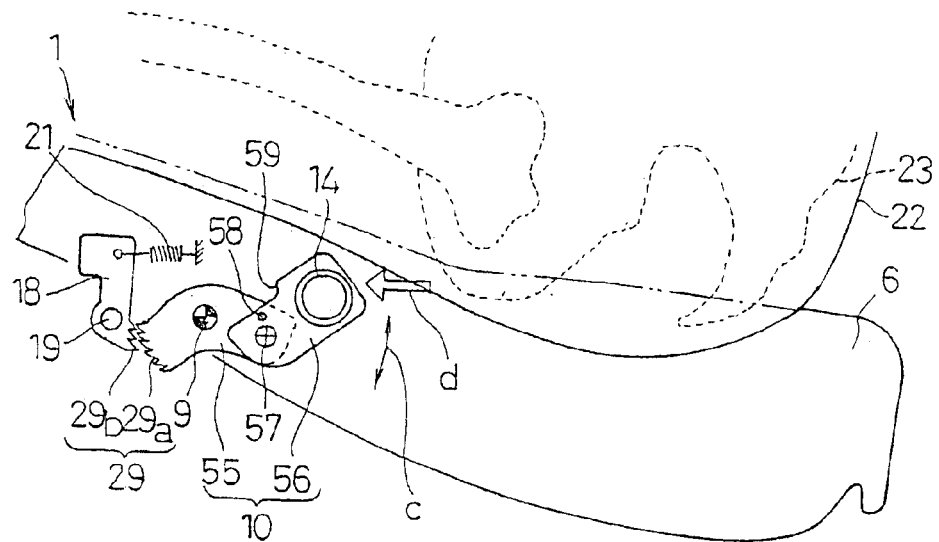
FIG. 16 is a side view showing an essential configuration of a fifth embodiment of the car seat of the present invention.
Figure 18:
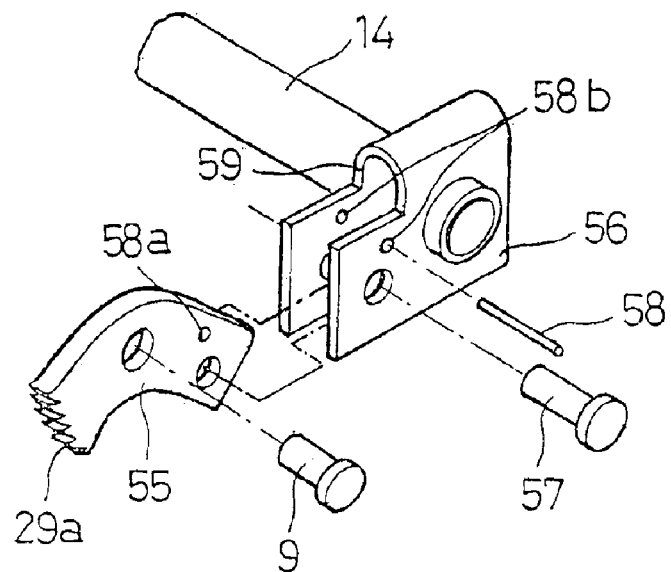
FIG. 18 is an exploded perspective view of a swing arm of the embodiment.

Then, in the present embodiment, as shown in FIG. 16, the right and left swing arms 10 are each composed of two members which are coupled so as to be rotatable between the spindle pin 9 and the catch member 14 when under a predetermined load. More specifically, the swing arms 10 each comprise: a first swing member 55 which is rotatably supported by a spindle pin 9 at its center and is provided with ratchet teeth 29a on a front lower end thereof; and a second swing member 56 which is swingably coupled at its bottom to the other end of the first swing member 55 via a fulcrum pin 57, the catch member 14 being fixed or integrally attached to the top thereof. As shown in FIG. 18, the second swing member 56 is constituted by bending a plate material into an inverted U shape to sandwich the first swing member 55 from both sides.

A shear pin 58 for fixing these first and second swing members 55 and 56 to each other at a certain rotational position when under normal conditions and being sheared to make the first and second swing members 55 and 56 rotatable when the second swing members 56 undergo a predetermined or higher load via the catch member 14, is arranged through pin holes 58a and 58b made in these first and second swing members 55 and 56. A stopper 59 is also provided for inhibiting further rotation when the second swing member 56 rotates upward by a predetermined angle with respect to the first swing member 55.

According to the foregoing configuration, when a passenger sits on the seat cushion 1 of the car seat or when the passenger operates pedals, the cushion pad 6 is compressed with downward displacement. Here, the pendulum members 18 make no forward swing since they are urged to move backward by the urging forces of the extension springs 21.

Thus, the catch member 14 is pressed down and the swing arms 10 swing downward easily. The catch member 14 smoothly moves up and down as shown by the arrow c in FIG. 16, thereby avoiding a sense of discomfort to the passenger and deterioration in the seating comfort.

Moreover, since the pendulum members 18 are urged to move backward by the extension springs 21 as described above, there is no possibility that the downward movement of the catch member 14 is inhibited accidentally to deteriorate the seating comfort in normal use.

Figure 17:
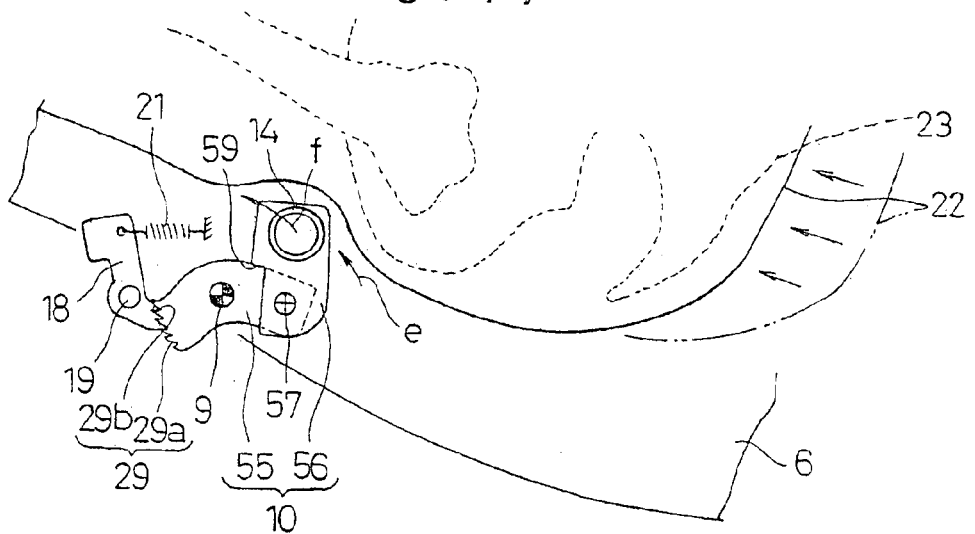
FIG. 17 is a side view showing the state of the essential configuration of the embodiment in operation.

On the other hand, when the vehicle encounters a frontal crash to cause an abrupt deceleration, the pendulum members 18 inertially swing forward about the pivotal support pins 19 against the urging forces of the extension springs 21. As shown in FIG. 17, the ratchet pawls 29b on their rear edges come into engagement with the ratchet teeth 29a on the front edges of the swing arms 10, whereby the swing arms 10 are prevented from swinging in the direction that moves the catch member 14 downward (clockwise, in the shown example).

Furthermore, when the passenger's rear end 22 starts to move forward due to the inertial force at the time of the abrupt deceleration, the catch member 14 undergoes a load from behind as shown by the outlined arrow d in FIG. 16. If the height position of the catch member 14 is higher than the height position of the spindle pins 9, this load causes a component force for lifting up the catch member 14. Since the ratchet teeth 29a and the ratchet pawls 29b allow the counterclockwise swing of the swing arms 10, the swing arms 10 swing to move the catch member 14 upward and are locked at that position. Thus, even when the passenger's rear end 22 starts to move forward, the rear end 22 is surely caught by this catch member 14.

On the other hand, even when the height position of the catch member 14 at the time of action of an abrupt deceleration is not much higher than the height position of the spindle pins 9 depending on the seating position or body size of the passenger as shown in FIG. 16, the catch member 14 undergoes a load as shown by the outlined arrow d. If the load reaches or exceeds a predetermined value, the shear pins 58 snap. As shown in FIG. 17, the second swing members 56 of the swing arms 10 swing as indicated by the arrow e, thereby moving the catch member 14 upward. Moreover, the energy of movement of the passenger is absorbed at the occasion of snap of these shear pins 58. Subsequently, the load acting on the catch member 14 causes a component force for lifting up the catch member 14 as is the case with the foregoing. The swing arms 10 swing upward as indicated by the arrow f to lift the catch member 14 further, and the forward movement of the passenger is surely suppressed by this catch member 14. Consequently, the catch member 14 surely prevents the forward movement of the passenger while the shearing of the shear pins 58 and the elastic deformation of the catch member 14 provide a high impact absorbing capability, whereby the forward movement energy of the passenger is surely absorbed to suppress the forward movement.

Figure 19:
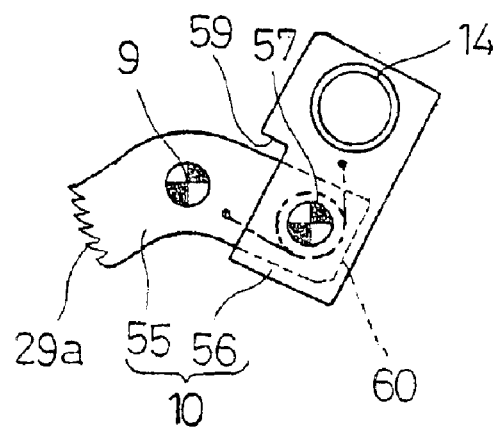
FIG. 19 is a side view of a modified configuration example of the swing arm of the embodiment.

The description of the foregoing embodiment has dealt with the case where the shear pins 58 are used as the configuration for making the first swing members 55 and the second swing members 56 rotatable when under a predetermined or higher load. Nevertheless, as shown in FIG. 19, the first swing members 55 and the second swing members 56 may be urged toward initial relative rotational positions and fixed to the rotational positions by means of torsion springs 60 so that they make rotations against the urging forces of these torsion springs 60 when under a predetermined or higher load.

Now, a sixth embodiment of the car seat of the present invention will be described with reference to FIG. 20 and FIGS. 21A to 21B.

Figure 20:
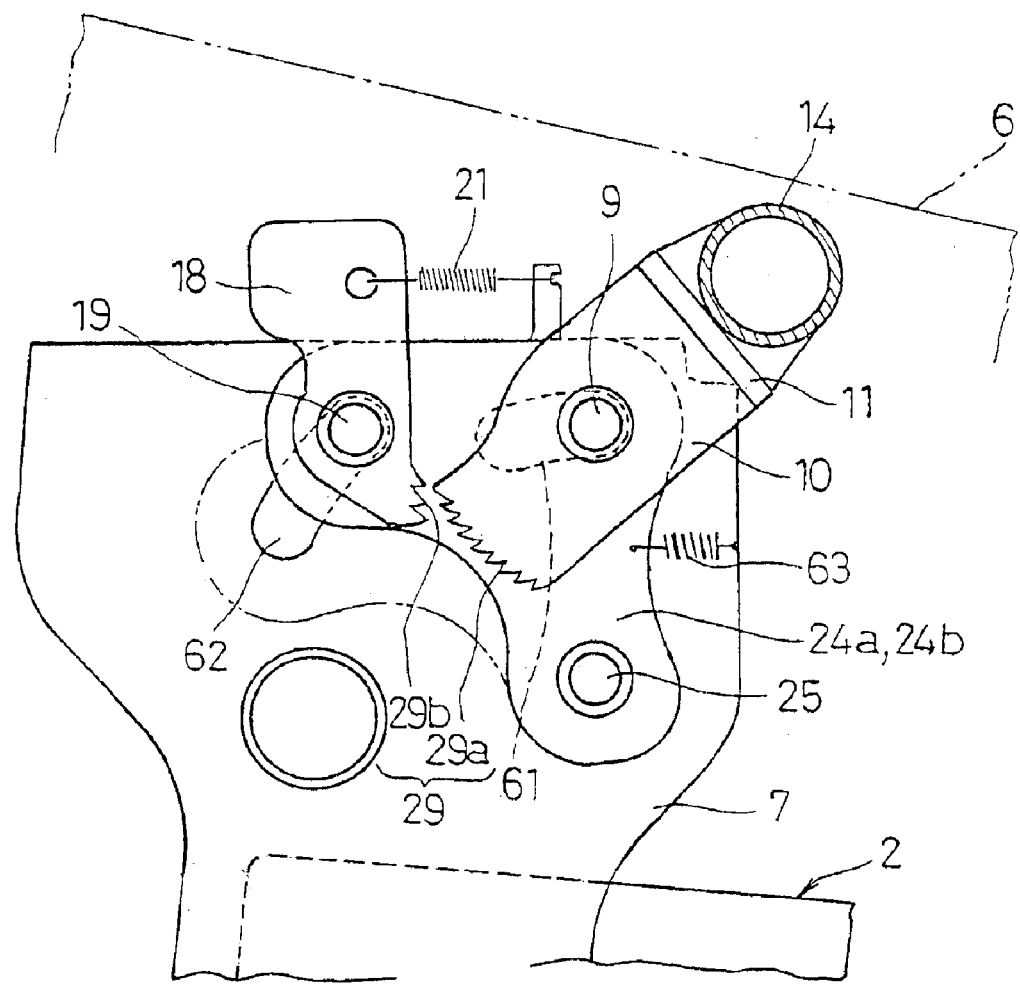
FIG. 20 is a side view showing an essential configuration of a sixth embodiment of the car seat of the present invention.

In FIG. 20, the present embodiment is configured on the basis of the foregoing second embodiment. The holding plates 24a and 24b are mounted on the support brackets 7 so as to be swingable back and forth about the mounting pins 25 for mounting and fixing the bottom ends thereof. The mounting pins 25 are arranged to lie almost immediately below the spindle pins 9 which pivotally support the swing arms 10 above. Then, the spindle pins 9 for pivotally supporting the swing arms 10 above and the pivotal support pins 19 for pivotally supporting the pendulum members 18 are mounted so as to be slidable along long holes 61 and 62 which are made in the support brackets 7 and has an arc-like shape about the mounting pins 25. Moreover, extension springs 63 for urging the holding plates 24a and 24b to swing backward are interposed between the holding plates 24a, 24b and the rear edges of the support brackets 7, and are configured so that the holding plates 24a and 24b are held with the spindle pins 9 almost immediately above the mounting pins 25 normally.

Figure 21A:
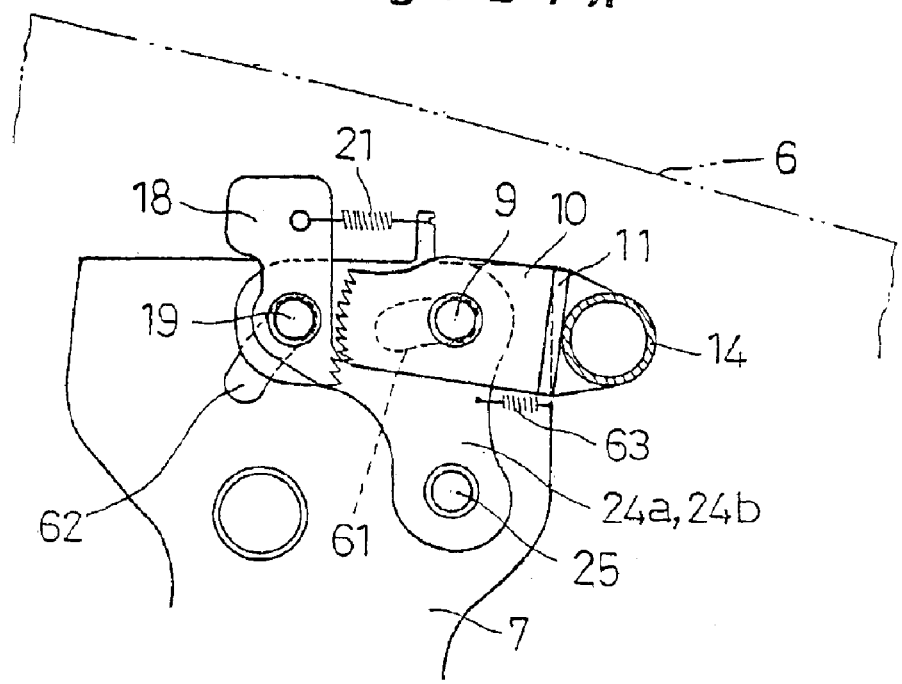
FIGS. 21A and 21B are explanatory diagrams of the operation in the embodiment.
Figure 21B:
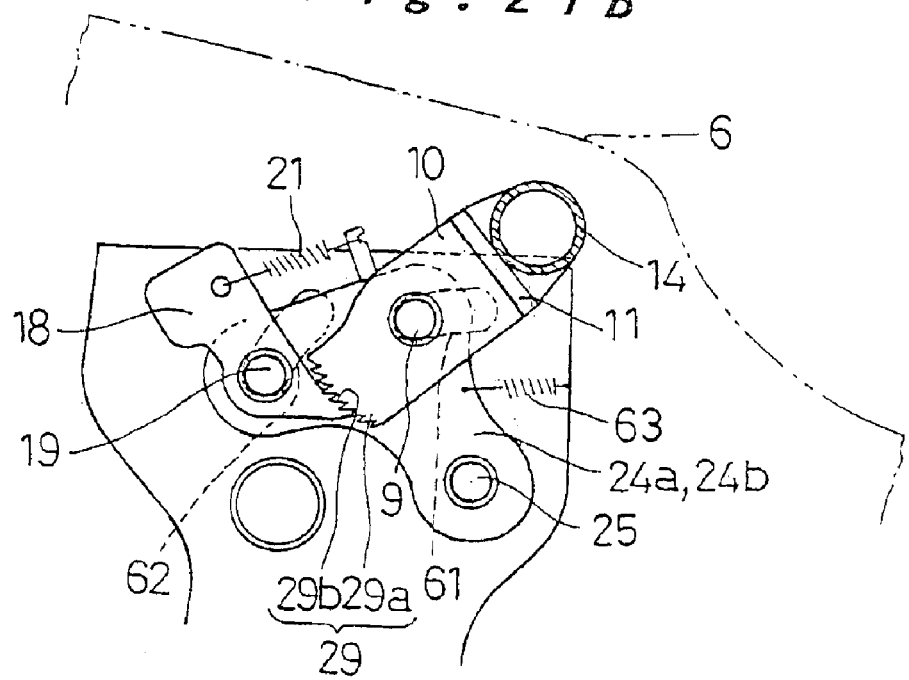

According to the foregoing configuration, even when the height position of the catch member 14 at the time of action of an abrupt deceleration is not much higher than that of the spindle pins 9 for pivotally supporting the swing arms 10 as shown in FIG. 21A due to the seating position or body size of the passenger, the holding plates 24a and 24b swing forward against the urging forces of the extension springs 63 as shown in FIG. 21B and the catch member 14 moves upward accordingly when the catch member 14 undergoes a predetermined or higher load from behind because of the start of forward movement of the passenger's rear end 22.

Consequently, when the passenger's rear end 22 starts to move forward and the catch member 14 undergoes a forward force from behind, there arises a component force in the direction that lifts the catch member 14 upward. Thus, the swing arms 10 swing further upward to lift the catch member 14 further. The forward movement of the passenger's rear end 22 is suppressed by the catch member 14 with higher reliability, so that the passenger is surely precluded from moving forward as is the case with the foregoing.

Now, a seventh embodiment of the car seat of the present invention will be described with reference to FIGS. 22A to 22B.

The foregoing embodiments have dealt with the cases where the pendulum members 18 are used as the lock means. To ensure the inertial swings for the sake of the locking facility, the plumb parts must be high in mass and be spaced away from the pivotal support pins 19 at the rotation centers. This increases the weights of the lock means and, in terms of spaces, requires a large space in front of the catch member 14 with a difficulty in securing the layout space.

Then, in the present embodiment, as shown in FIGS. 22A and 22B, the lock means is composed of lock members 65 which are supported so as to be slidable obliquely upward in front. Description will be given of the concrete configuration. Holding plates 66 are mounted and fixed onto the frame unit 5 of the seat cushion 1. Holding plates 67 are opposed and arranged inside with a predetermined distance therebetween. These holding plates 66 and 67 are fastened and fixed by spindle pins 9, which are shoulder shafts, and mounting shafts 68, which are similar shoulder shafts arranged below the same. The swing arms 10 for supporting both ends of the catch member 14 are swingably supported by the spindle pins 9. The lock members 65 are supported by the mounting shafts 68 so as to be slidable obliquely upward in front. The ratchet teeth 29a are formed on the bottom edges of the swing arms 10 and the ratchet pawls 29b are formed on the top edges of the lock members 65 to constitute ratchet mechanisms 29. The swing arms 10 are configured to inhibit the downward movement of the catch member 14 and allow the upward movement thereof when the lock members 65 inertially slide forward.

The sliding mechanisms of the respective lock members 65 are constituted by forming parallel parts 68a on the mounting shafts 68 over the areas for the lock members 65 to be arranged on, and perforating the lock members 65 with long holes 69 which make slidable engagement with the parallel parts 68a. In addition, the bottom edges of the holding plates 67 are bent into guide parts 67a with which the bottom edges of the lock members 65 make engagement so that the lock members 65 are guided along the slide direction. These guide parts 67a facilitate positioning the parallel parts 68a around the shaft axes in fastening and fixing the mounting shafts 68. Moreover, since the lock members 65 are to slide obliquely upward, the possibility of accidental forward move is reduced by the action of gravitation. For the sake of avoiding accidental forward movement with higher reliability, however, extension springs 70 are interposed between the ends of rear extended portions 67b of the holding plates 67 and the rear ends of the lock members 65.

According to the present embodiment, upon an abrupt deceleration, the lock members 65 slide obliquely upward in front because of an inertial force. The lock members 65 simply make a short-range movement to lock the swing arms 10 and inhibit the downward movement of the catch member 14, so that the forward movement of the passenger upon an abrupt deceleration is suppressed immediately with reliability. In addition, the use of the lock members 65 downsizes and simplifies the configuration as compared to the cases where the pendulum members 18 are arranged, thereby achieving miniaturization and reductions in weight and cost. Since compact arrangement in the spaces under the swing arms 10 is possible, those members protruding in front of the catch member 14 disappear. This allows increases in the flexibility of mounting onto the seat cushion 1; for example, the possibility of interference with the up-and-down mechanism of the seat cushion 1 is eliminated.

Now, an eighth embodiment of the car seat of the present invention will be described with reference to FIGS. 23A to 25D.

Figure 23A:
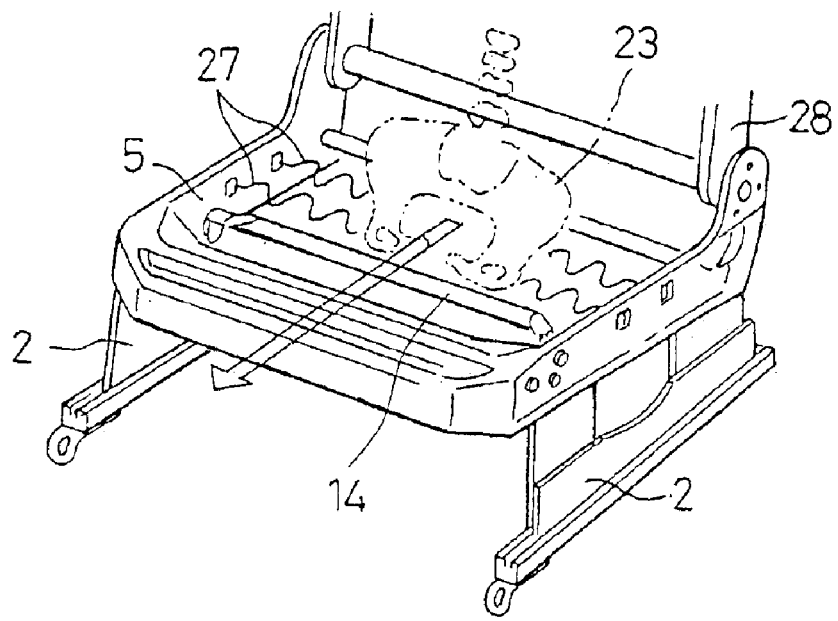
FIGS. 23A and 23B are perspective views for explaining a problem with the catch members of the car seats of the foregoing embodiments.
Figure 23B:
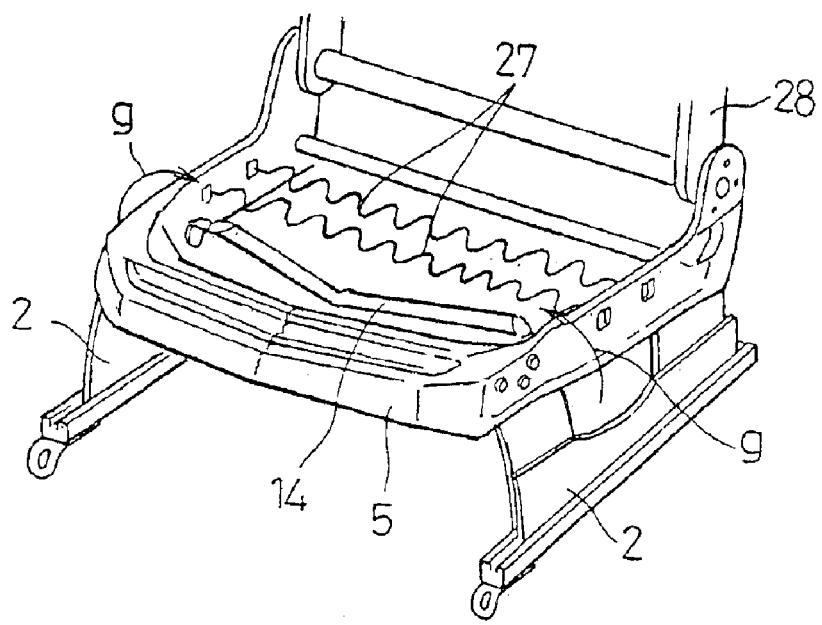

In the foregoing embodiments, as shown in FIG. 23A, the catch member 14 uses one having a uniform section modulus along its entire length, such as a pipe member. When the passenger's pelvis 23 thrusts forward strongly as indicated by the arrow upon an abrupt deceleration or the like and a large downward load toward the front acts on the center portion of the catch member 14, the center portion of the catch member 14 thus undergoes the maximum stress. Consequently, the catch member 14 might be bent down in the center into a V shape as shown in FIG. 22B and the pelvis 23 slips out forward, possibly failing to provide the effect of suppressing forward movement sufficiently. In view of this, the frame unit 5 may be increased in rigidity so that both sides thereof are prevented from giving inside as shown by the arrows g in FIG. 23B, thereby suppressing the bend of the catch member 14. This is not a preferable countermeasure, however, because of its ineffectiveness despite the weight increase.

Figure 24A:
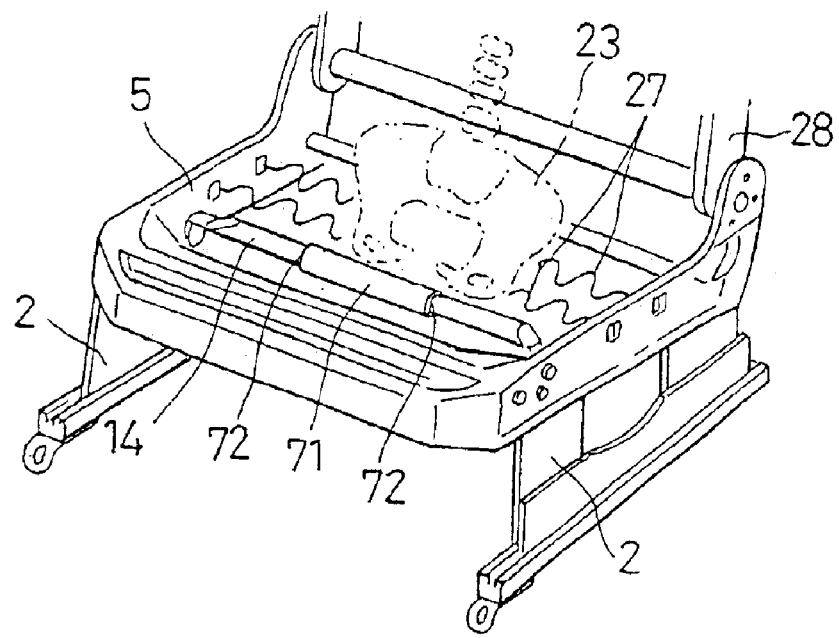
FIG. 24A is a perspective view showing a general configuration of an eighth embodiment of the car seat of the present invention.
Figure 24B:
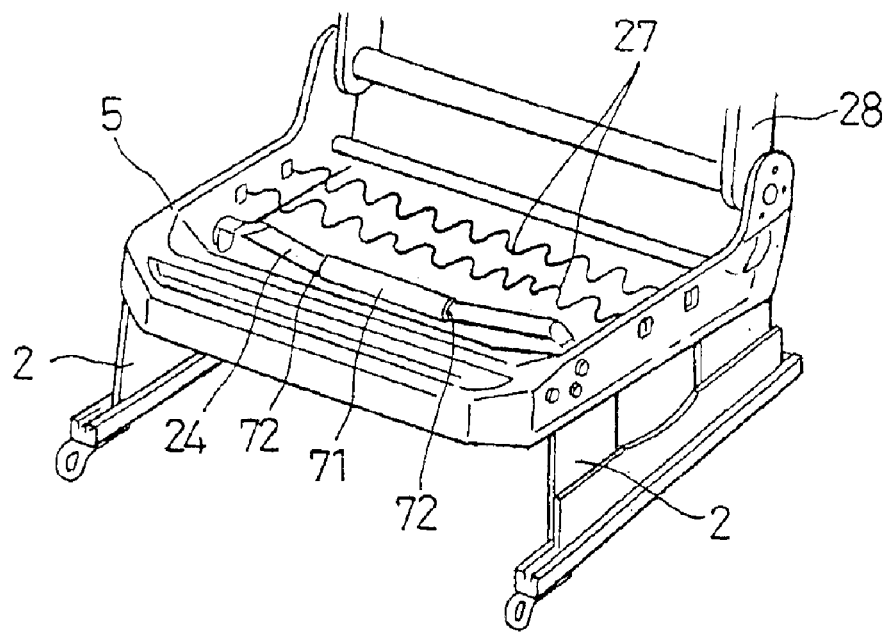
FIG. 24B is a perspective view showing the state of operation of the embodiment.

Then, in the present embodiment, as shown in FIG. 24A, the center portion of the catch member 14 is provided with a reinforcing part 71 which has higher rigidity over an appropriate range in length. Bend inducing portions 72 are arranged on both sides thereof. According to such a configuration, when the catch member 14 undergoes a large downward load toward the front at its center portion, it will not bend in the single center position but cause two downward bends on both sides of the center portion as shown in FIG. 24B. This disperses the stress and precludes a large downward bend, making it hard for the pelvis 23 to slip out. The effect of absorbing the impact energy is also increased to ensure the effect of suppressing the forward movement of the passenger.

Figure 25A:
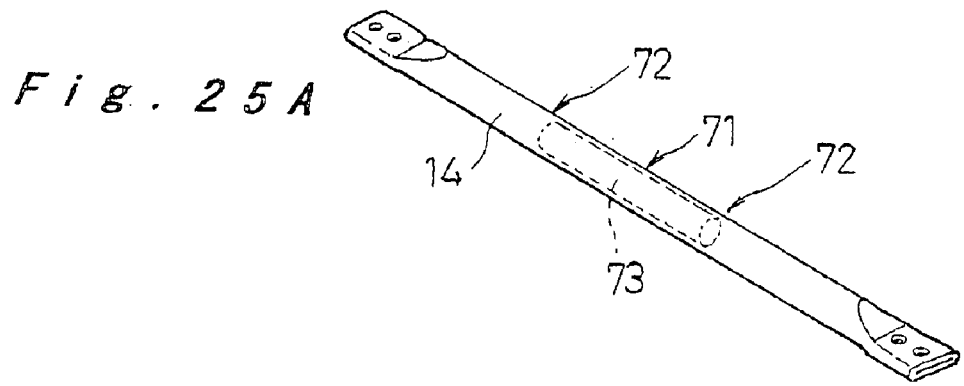
FIGS. 25A to 25D are perspective views showing various configuration examples of the catch member of the embodiment.
Figure 25B:
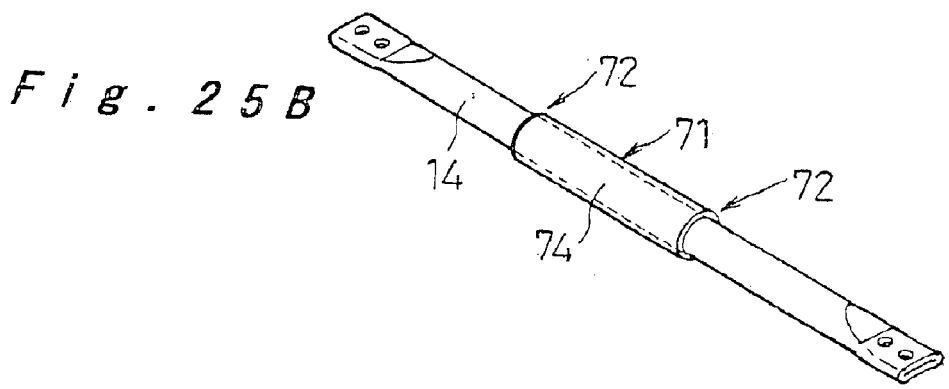
Figure 25C:
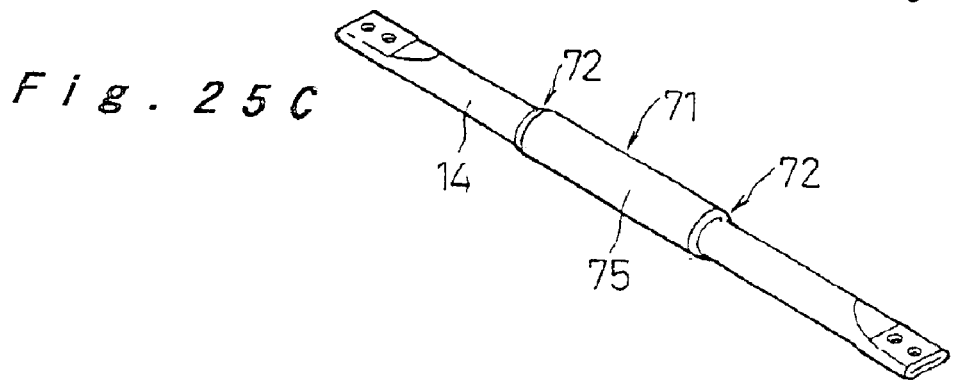
Figure 25D:
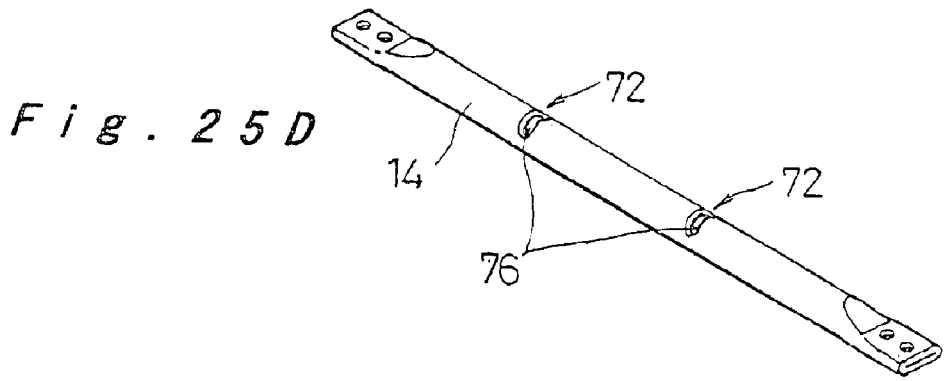

The possible methods for providing the reinforcing part 71 thus on the center portion of the catch member 14 include ones in which: a reinforcing pipe 73 is inserted into the catch member 14 which is made of a pipe as shown FIG. 25A; a reinforcing pipe 74 is fitted and fixed to the outer surface of the catch member 14 as shown in FIG. 25B; and a pipe having a different thickness or diameter is integrally joined or molded onto the center portion so that a high-rigidity pipe portion 75 is provided on the center portion. Moreover, instead of providing the reinforcing part 71 on the center portion, bend inducing portions 72 may be provided at two or more points other then the center position by forming low-rigidity portions 76 deformed to have a smaller section modulus as shown in FIG. 25D.

Now, a ninth embodiment of the car seat of the present invention will be described with reference to FIGS. 26A to 29.

Figure 26A:
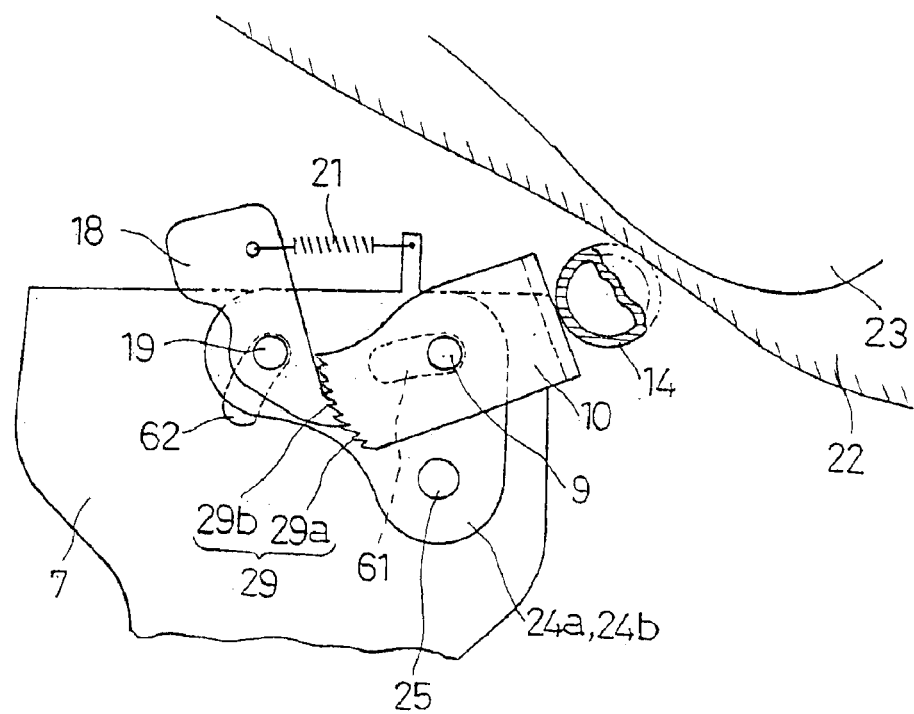
FIGS. 26A and 26B are side views for explaining another problem with the catch members of the car seats of the foregoing embodiments.
Figure 26B:
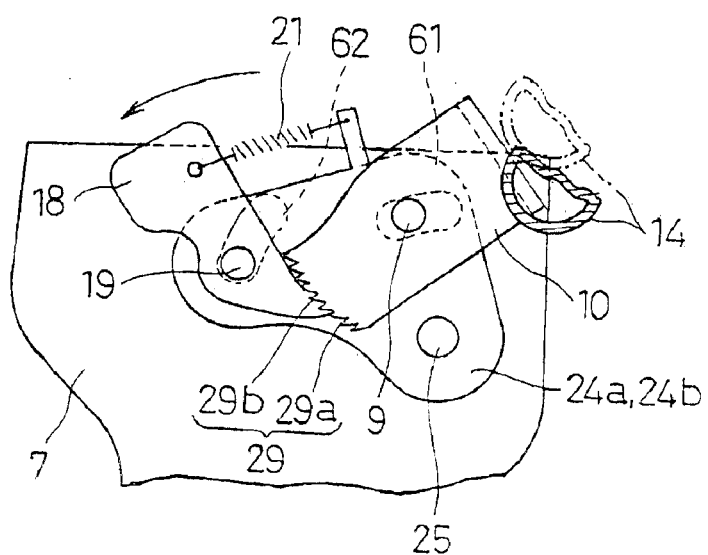

In the foregoing embodiments, the catch member 14 uses one having a uniform section modulus along its entire length, such as a pipe member. When an obliquely-downward large load acts on the catch member 14 from the pelvis 23 of the passenger's rear end 22 upon an abrupt deceleration, thus the catch member 14 is easily deformed in sectional shape as squashed in the direction of the load. This produces the problem that the catch member 14 is bent downward largely and may fail to suppress the forward movement of the passenger with reliability. This problem also remains even when the catch member 14 is configured to move upward under a load acting on the catch member 14 to achieve the configuration for suppressing the forward movement with higher reliability. By way of example, description will be given of the case of the foregoing sixth embodiment (see FIG. 20 and FIGS. 21A to 21B) with reference to FIGS. 26A and 26B. Since a pipe member is used as the catch member 14 as shown by the phantom lines in FIG. 26A, when an obliquely-downward large load acts on the catch member 14 from the pelvis 23 of the passenger's rear end 22 upon an abrupt deceleration, the catch member 14 is easily deformed in sectional shape as squashed in the direction of the load as shown by the full lines, causing an obliquely-downward large bend toward the front. If, in that state, the catch member 14 is lifted upward by the rotation of the holding plates 24a and 24b as shown in FIG. 26B, the direction of the bend turns even downward. This presents the problem that an additional downward deformation can easily occur due to the load from the passenger and it might be impossible to suppress the forward movement of the passenger with reliability.

Figure 27A:
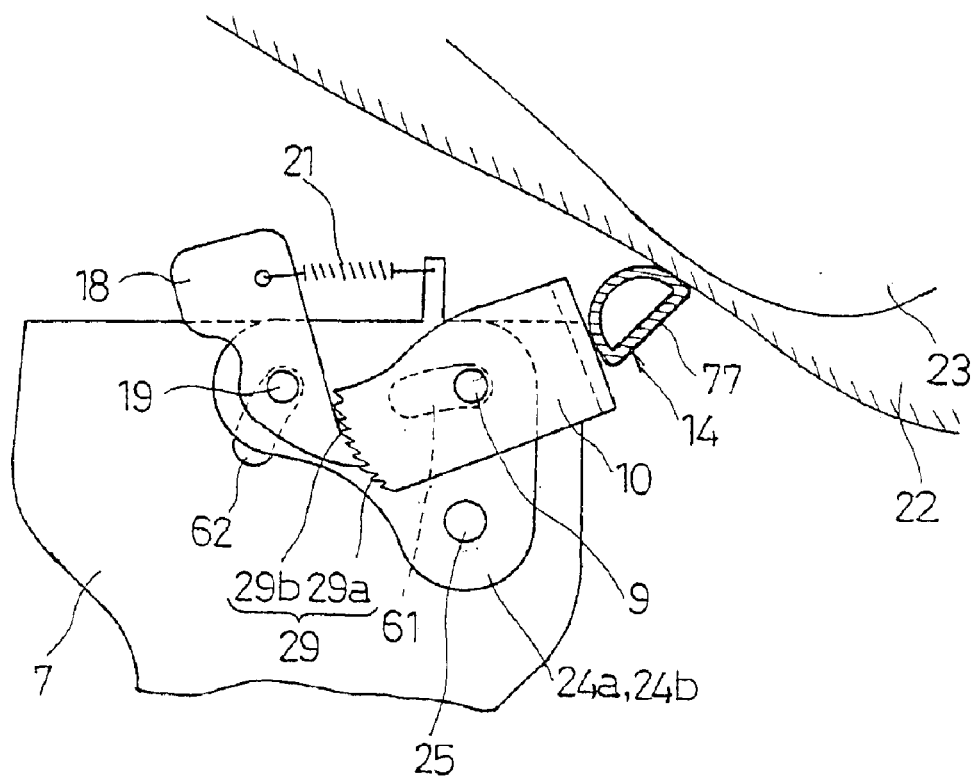
FIG. 27A is a side view showing the general configuration of essential parts of a ninth embodiment of the car seat of the present invention.
Figure 27B:
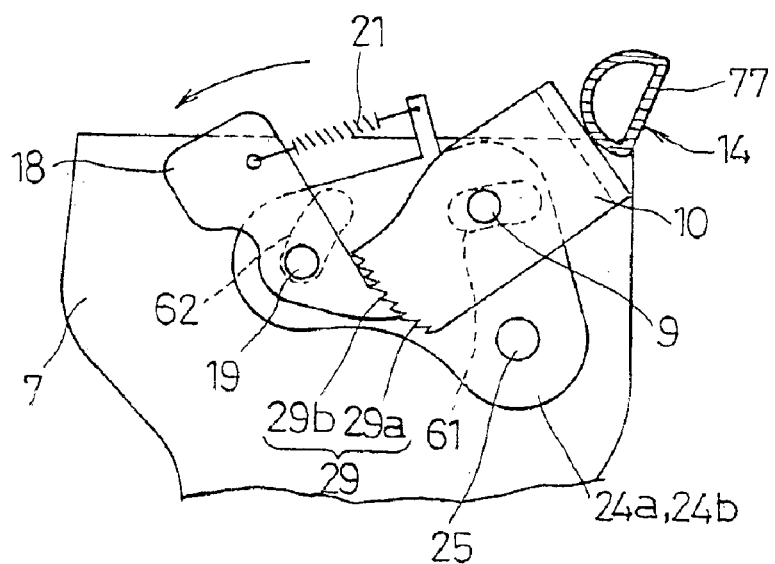
FIG. 27B is a side view showing the state of operation of the embodiment.
Figure 28:
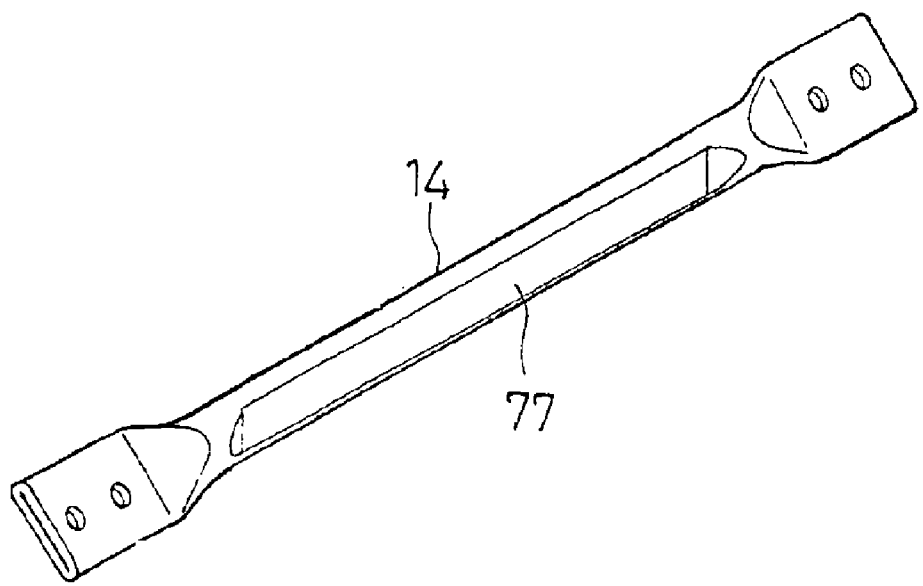
FIG. 28 is a perspective view showing the catch member of the embodiment.
Figure 29:
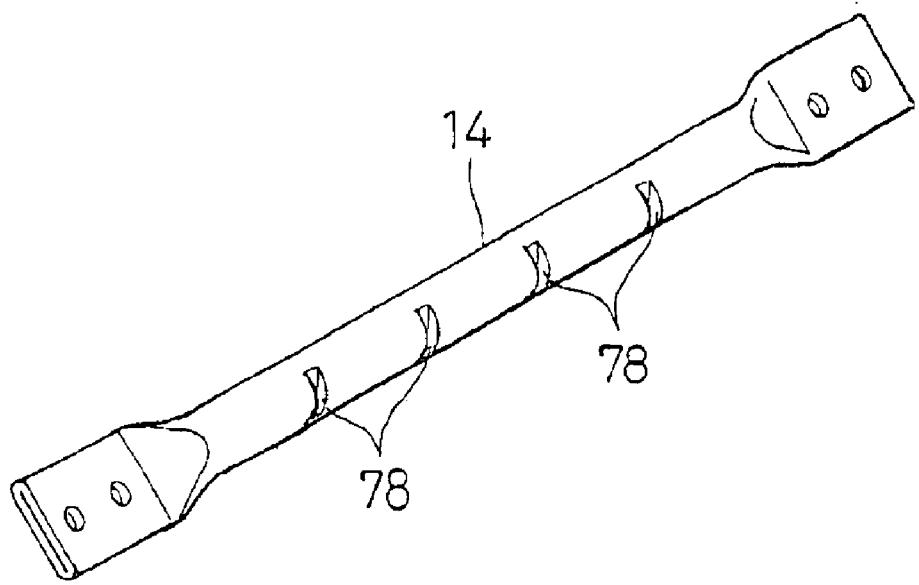
FIG. 29 is a perspective view showing another example of the catch member of the embodiment.

Then, in the present embodiment, as shown in FIGS. 27A to 27B, the essential part of the catch member 14 is given such a sectional shape that it has a greater section modulus in the direction in which the pelvis 23 of the passenger's rear end 22 imposes a large load upon an abrupt deceleration, and has a smaller section modulus in the direction orthogonal thereto. As shown in FIG. 28, the illustrated example is shaped such that a flat portion 77 spreading along the direction of input of the load, or obliquely downward, is formed to provide a greater sectional height almost across the entire length of the catch member 14 except both ends, and provide a smaller sectional height in the direction orthogonal thereto. Incidentally, instead of the flat portion 77, bead-like grooves 78 may be formed at appropriate intervals along the longitudinal direction of the catch member 14 so as to increase the section modulus in the direction of input of the load.

According to such a configuration, when an obliquely-downward impact load is input to the catch member 14 from the passenger's rear end 22 upon an abrupt deceleration, the impact load acts on the catch member 14 in the direction of high rigidity and thus causes no large deformation as shown in FIG. 27A. Subsequently, when the holding plates 24a and 24b are rotated to lift up the catch member 14 by the action of the input load as shown in FIG. 27B, the lower section modulus of the catch member 14 is seen in the front-to-back direction, not the vertical direction. The passenger's rear end 22 is thus surely caught by the lifted-up catch member 14, and in that state the catch member 14 is deformed forward to absorb the impact energy to suppress the forward movement of the passenger with reliability.

Figure 30A:
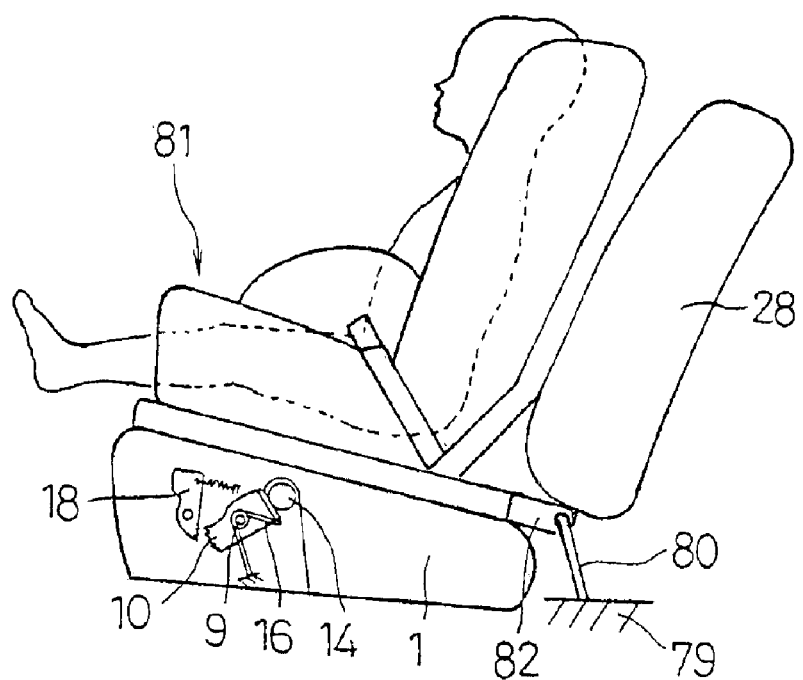
FIG. 30A is a side view showing a general configuration of a tenth embodiment of the car seat of the present invention.

Now, a tenth embodiment of the car seat of the present invention will be described with reference to FIGS. 30A and 30B.

In the present embodiment, an anchor 80 for fixing a child seat 81 is arranged to lie near a position between the rear end of the seat cushion 1 and the bottom end of the seat back 28 in the configuration of each of the foregoing embodiments (the third embodiment, in the shown example). The anchor 80 is firmly attached to the body frame. To install the child seat 81 on this seat cushion 1, a to-be-locked portion 82 provided on the rear bottom end of the child seat 81 is locked to the anchor 80 as shown in FIG. 30A.

Figure 30B:
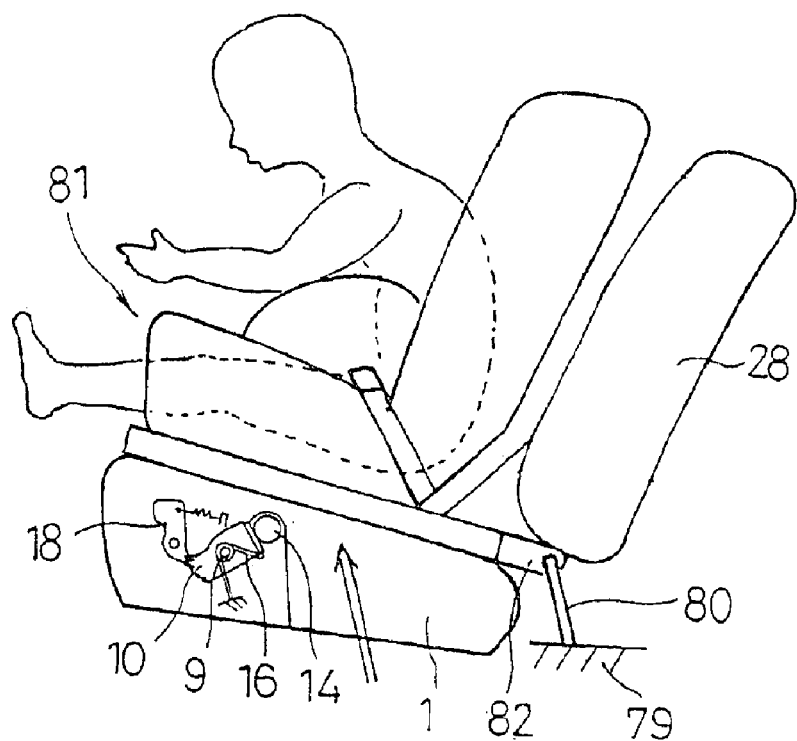
FIG. 30B is a side view showing the state of operation of the embodiment.

According to such a configuration, when an abrupt deceleration occurs from a frontal crash or the like with the child seat 81 installed on the seat cushion 1, the downward movement of the catch member 14 is inhibited by the action of the lock means, or the pendulum members 18, as shown in FIG. 30B as in the foregoing embodiments. Even when the child seat 81 on the seat cushion 1 undergoes rotation moment such as a forward swing, the front bottom of the child seat 81 is supported by the catch member 14 from below as indicated by the arrow. Thus, the child seat 81 is prevented from swinging forward largely, and it is possible to ensure the safety of the child on the child seat 81.

Now, an eleventh embodiment of the car seat of the present invention will be described with reference to FIGS. 31A to 33.

In the foregoing tenth embodiment, the lock means operates upon an abrupt deceleration so that the downward movement of the catch member 14 is prevented to avoid the forward swing of the child seat 81. Thus, a delay in the operation of the lock means, if any, may limit the effect. Meanwhile, when the child seat 81 is installed on the seat cushion 1, there will be no deterioration in seating comfort even if the catch member 14 cannot be lowered.

Figure 31A:
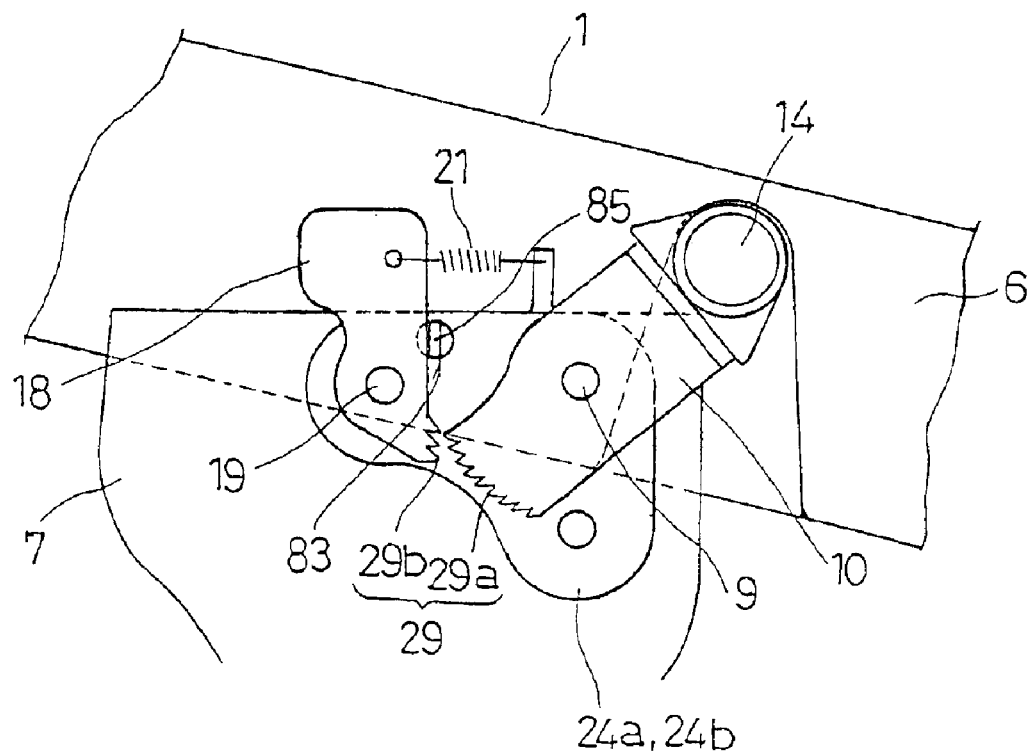
FIG. 31A is a side view showing an essential configuration of an eleventh embodiment of the car seat of the present invention.
Figure 31B:
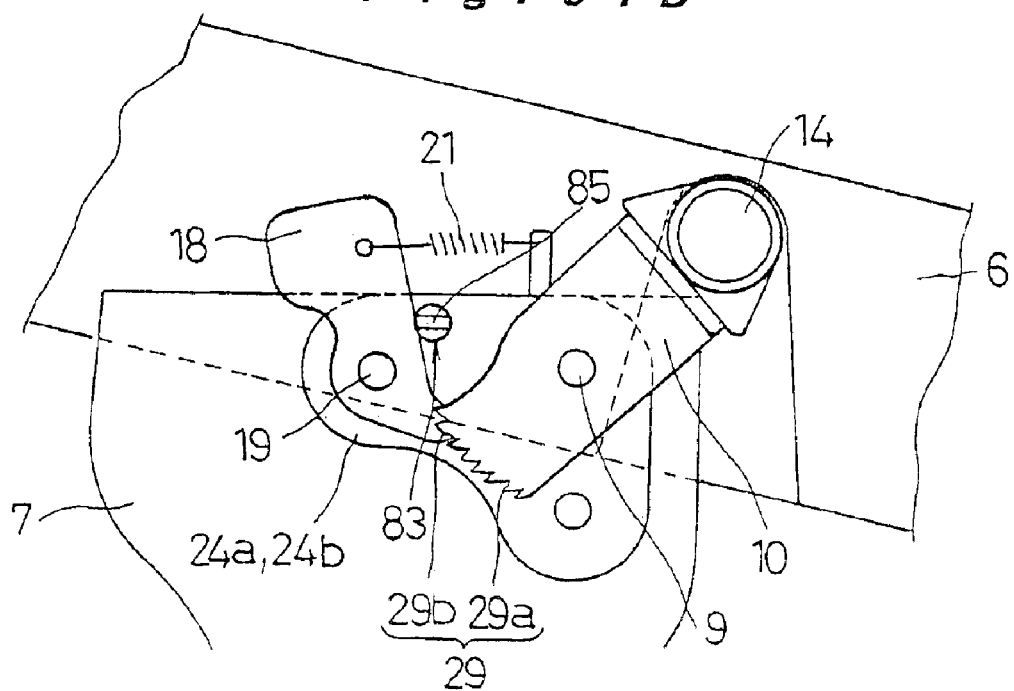
Figure 32A:
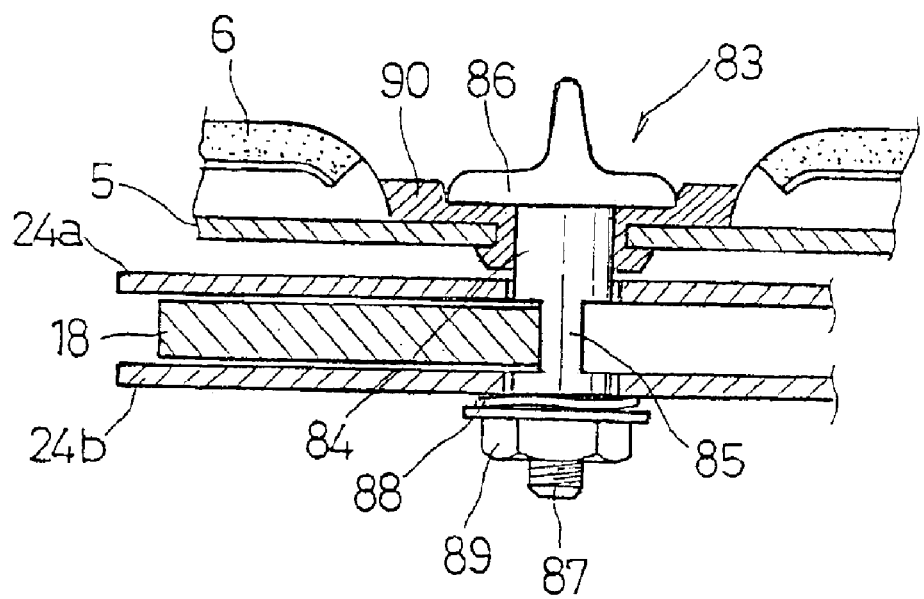
FIG. 32A is a detailed cross-sectional plan view of essential parts of the embodiment in an unlocked state.
Figure 32B:
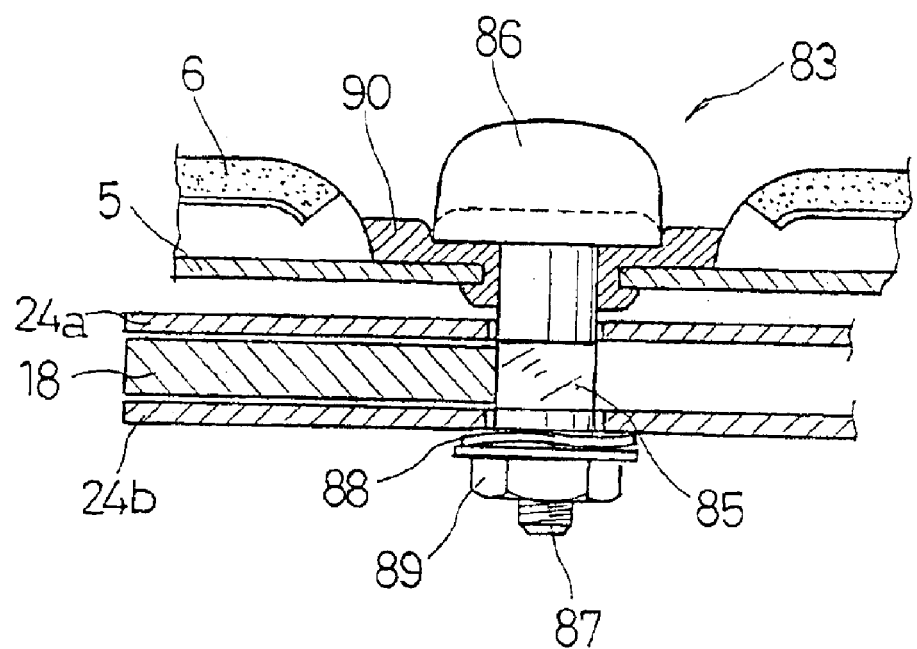
FIG. 32B is a detailed cross-sectional plan view of the essential parts in a locked state.
Figure 33:
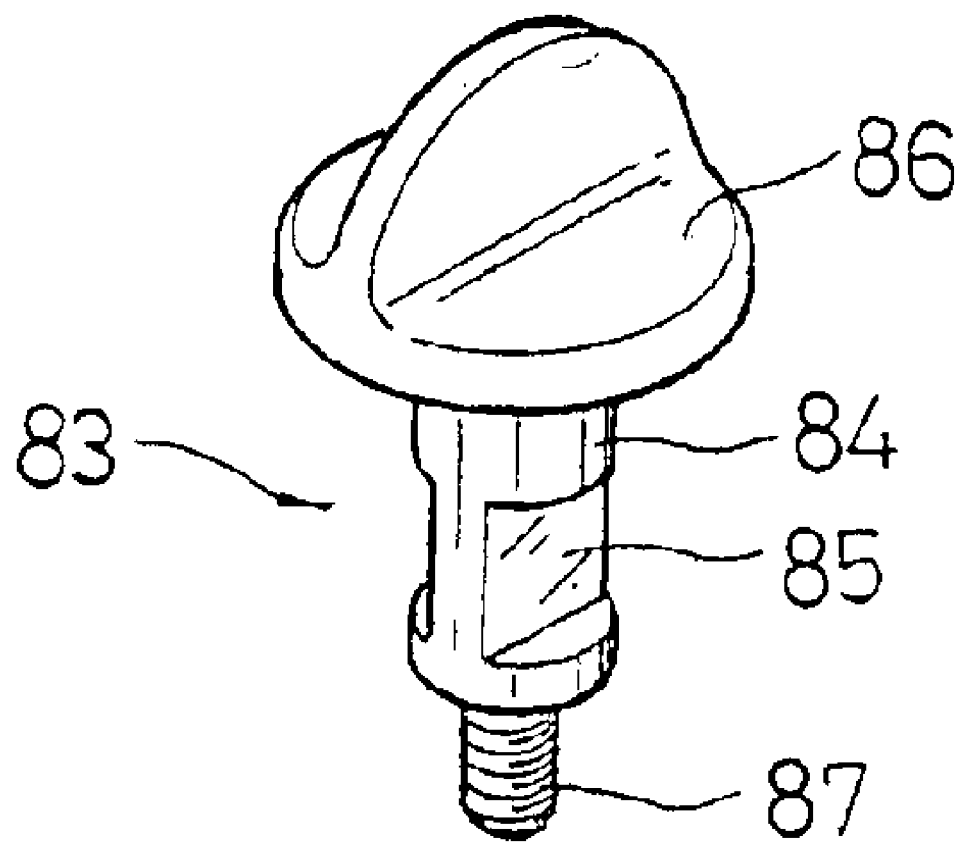
FIG. 33 is a perspective view showing lock operation means of the embodiment.
Figure 35:
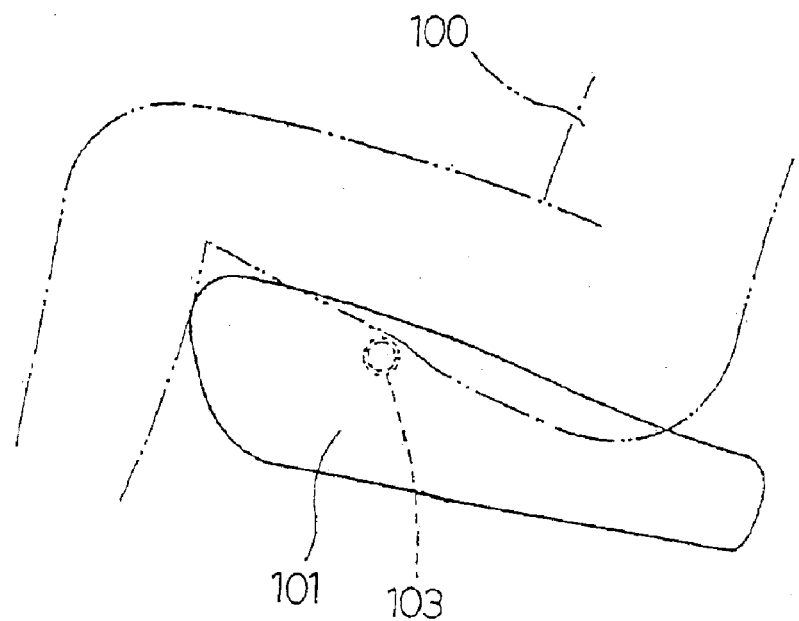
FIG. 35 is an explanatory diagram of the means for preventing forward movement of the passenger upon an abrupt deceleration in a conventional example.
Figure 36A:
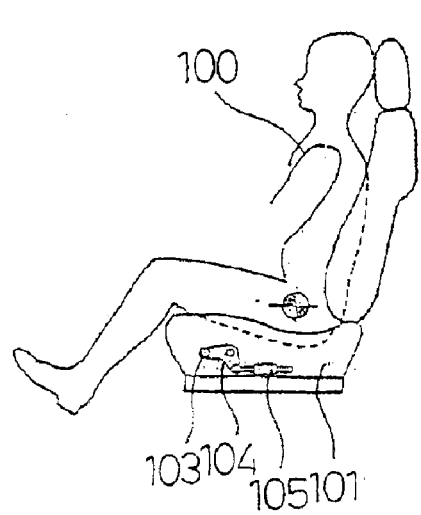
FIGS. 36A and 36B are explanatory diagrams of the operation of a car seat provided with the means for preventing the forward movement of the passenger upon an abrupt deceleration according to another conventional example.
Figure 36B:
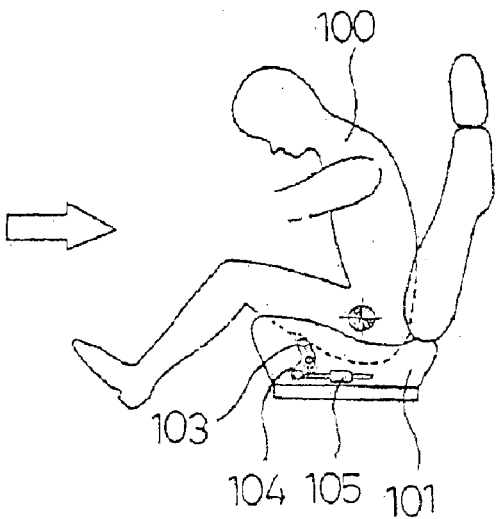
Figure 37:
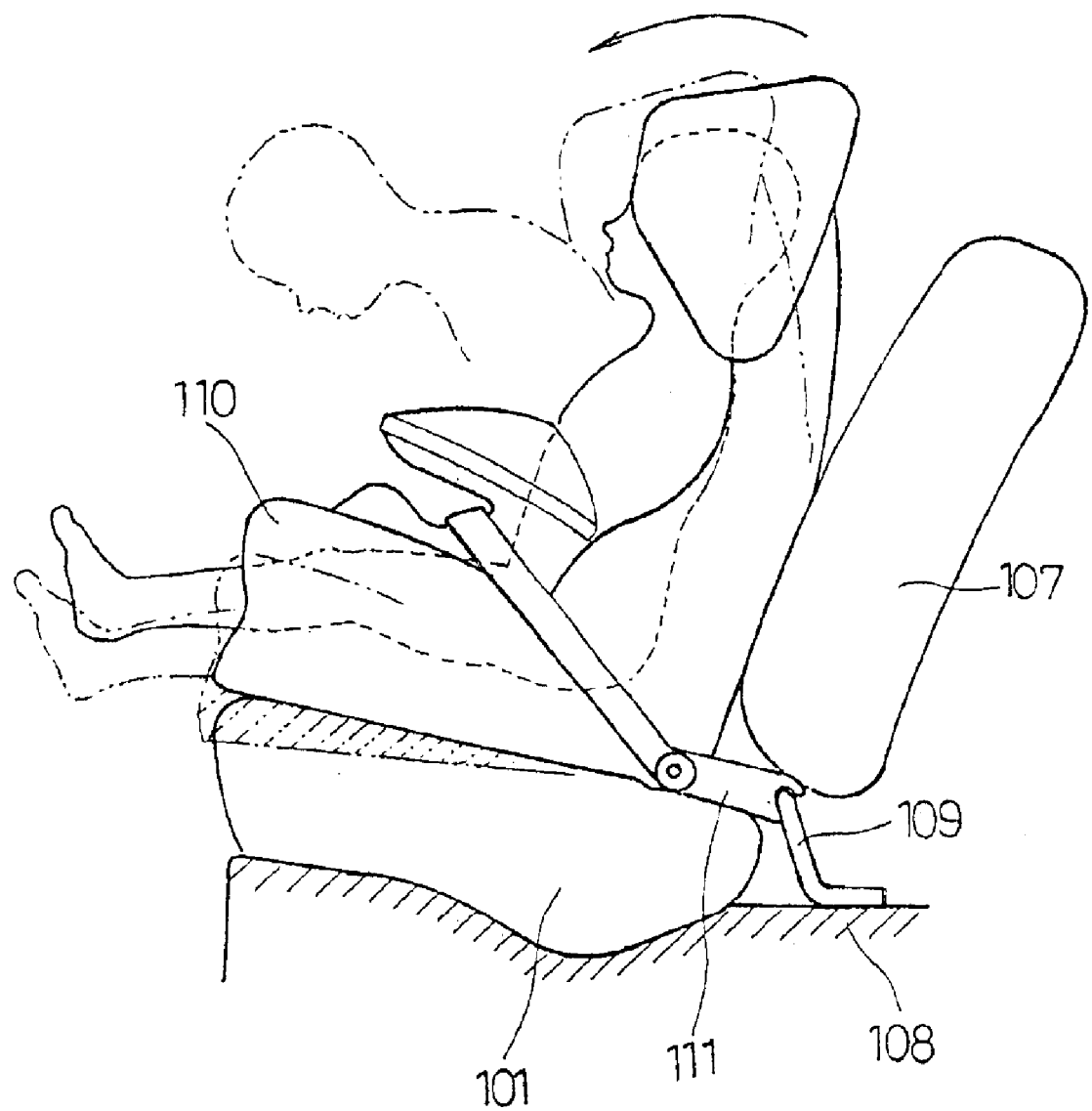
FIG. 37 is a side view showing the state of a car seat of a conventional example on which a child seat is mounted, and a problem thereof.
Figure 38A:
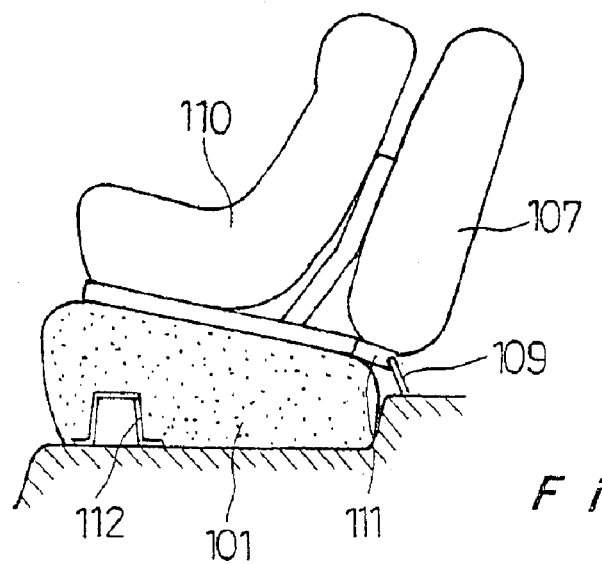
FIGS. 38A to 38C are side views showing conventional means for solving the problem.
Figure 38B:
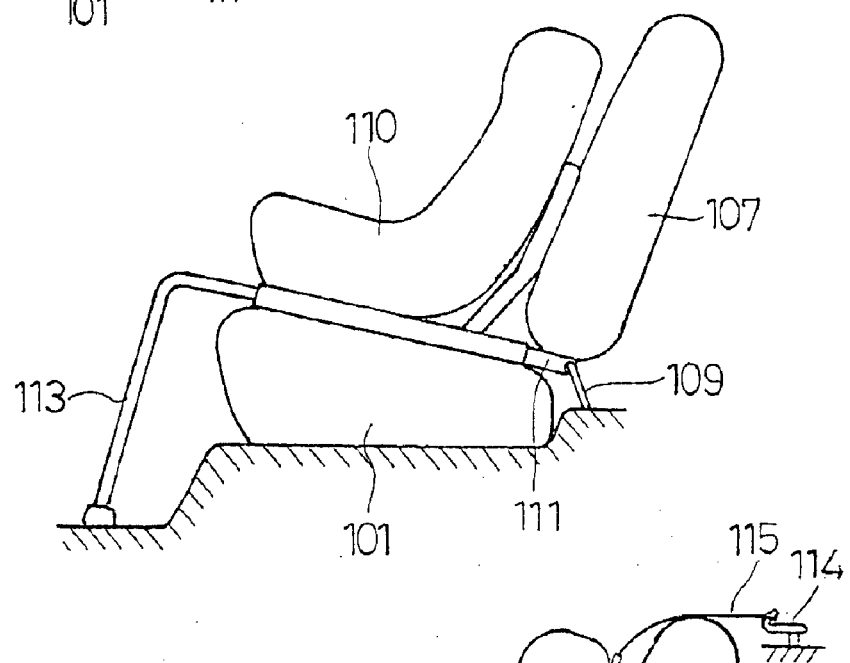
Figure 38C:
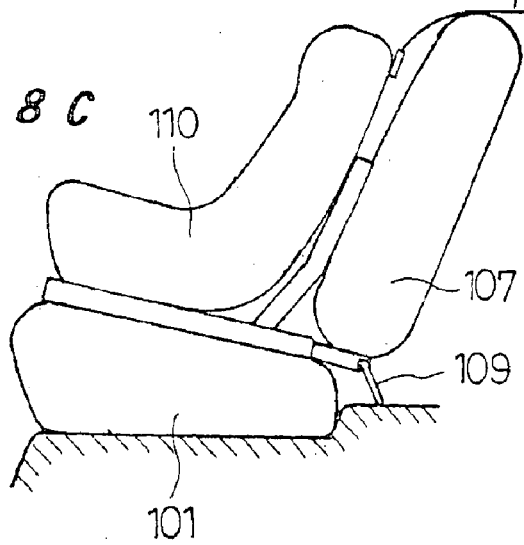

Then, the present embodiment provides lock operation means 83 for switching the pendulum members 18, or the lock means, between an unlocked state (see FIG. 31A) and a locked state (see FIG. 31B). As shown in detail in FIGS. 32A, 32B and 33, the lock operation means 83 comprises a shaft 84 having a length for piercing through a side of the frame portion 5 of the seat cushion 1 and the holding plates 24a and 24b. An operating plate portion 85 having a thickness smaller than its width, which corresponds to the diameter, is arranged on the shaft 84 over an area facing the space between the holding plates 24a and 24b. The shaft 84 is arranged so that the operating plate portion 85 is in engagement with the rear edge of the pendulum member 18 above the pivotal support pin 19. An end of the shaft 84 faces the exterior of the frame unit 5 of the seat cushion 1 and is provided with a rotary operation knob 86. The other end of the shaft 84 is provided with a mounting screw 87 over an area protruding inward from the holding plate 24b, and is fastened by a nut 89 via a spring washer 88. Designated by 90 is a resin bearing member which is mounted on a portion of the frame unit 5 where the shaft 84 pierces through. The outer side of this resin bearing member 90 is provided with an indication for indicating which position the rotary operation knob 86 is in, the locked state or the unlocked state.

According to such a configuration, when under normal use conditions, the rotational position of the rotary operation knob 86 is set to the unlock position so that the operation plate member 87 becomes parallel to the rear edge of the pendulum member 18 as shown in FIG. 31A. The pendulum member 18 is in the state of being swingable back and forth, thus exercising the effect of suppressing the forward movement of the passenger as in the foregoing embodiments. On the other hand, when the child seat 81 is installed, the rotary operation knob 86 is operated to set the rotational position to the lock position so that the side edge of the operation plate portion 87 is engaged with the rear edge of the pendulum member 18, making the pendulum 18 swung as upon an abrupt deceleration as shown in FIG. 31B. The ratchet pawls 29b are engaged with the ratchet teeth 29a of the swing arm 10 to inhibit the downward movement of the catch member 14 resulting from the swing of the swing arm 10. The catch member 14 is fixed at the lifted position. Consequently, the front bottom of the child seat 81 is supported from below by the catch member 14, so that the large forward swing of the child seat 81 is surely prevented to secure the safety of the child on the child seat 81.

Incidentally, each of the foregoing embodiments has been described for situations where the catch member 14 is vertically swingably supported by the swing arms 10. It is also possible, though, to support the catch member 14 vertically movably along a guide and provide such a configuration that the downward movement of the catch member 14 is inhibited by lock means that inertially protrudes into the guide. Nevertheless, vertically swingably supporting the catch member 14 by using the swing arms 10 or the like can secure stable operation and necessary strength with a simple and compact structure.

INDUSTRIAL APPLICABILITY

As above, the car seat according to the present invention secures seating comfort by the catch part easily moving at the time of seating of the passenger, and, upon a frontal crash, inhibit the movement of the catch part with the lock means for operating with an inertial force, thereby surely suppressing the forward movement of the passenger with this catch part. Moreover, it contains neither a push-up mechanism nor driving means of the catch part. Thus, as a car seat of lightweight low-price configuration, it is suited to ensuring the safety of a passenger in various types of motor vehicles.

What is claimed is:

1. A car seat comprising: a catch part arranged inside a front portion of a seat cushion so as to be vertically movable, said portion lying in front of a rear end of a seated passenger said catch part extending in a width direction of said seat cushion; means for urging said catch part to move upward; and lock means operating with an inertial force upon an abrupt deceleration to inhibit vertical movement of said catch part.

2. The car seat according to claim 1, wherein said catch part is supported by a strength member inside said seat cushion via a spindle so as to be vertically swingable, and said urging means is arranged around said spindle.

3. The car seat according to claim 1, wherein said lock means comprises a pendulum member having a mesh engaging part for said catch part, said pendulum member being mounted on a strength member so as to be swingable back and forth, said catch part being pivotally supported by said strength member.

4. The car seat according to claim 3, comprising urging means for urging said pendulum member opposite to a direction for engagement with said catch part.

5. The car seat according to claim 1, wherein said lock means comprises a lock member having a mesh engaging part for said catch part, said lock member being mounted on a strength member so as to be slidable obliquely upward, said catch part being supported by said strength member.

6. The car seat according to claim 1, wherein said seat cushion has a structure in which a spring receiver part and said catch part are arranged under a cushion pad, and a plurality of spring receiver parts and said catch part are arranged front to back at appropriate intervals in parallel, with said catch part in a front row.

7. The car seat according to claim 6, wherein said spring receiver part comprises an S spring.

8. The car seat according to claim 1, wherein said lock means comprises a ratchet mechanism for inhibiting downward movement of said catch part and allowing upward movement thereof.

9. The car seat according to claim 1, comprising auxiliary means for moving said catch part upward based on inertial movement of a passenger resulting upon an abrupt deceleration.

10. The car seat according to claim 9, wherein said auxiliary means has a push-up engaging part on the front side and a receiver plate part on the rear side, said push-up engaging part coming into engagement with a bottom end of said catch part to make said catch part capable of being pushed up, said receiver plate portion lying below a rear end of the passenger, and said auxiliary means is supported vertically swingably, having a support tab extended down from a center portion thereof in the front-to-back direction.

11. The car seat according to claim 9, wherein said auxiliary means comprises a lifting bracket for making said catch part liftable and a wire cable for coupling said bracket and an operation arm lying below a pivotal support portion on a bottom end of an inner belt stay of a seat belt.

12. The car seat according to claim 1, wherein said catch part comprises a catch member extending in the width direction of said seat cushion and a pair of swing arms rotatably supported by a spindle, both ends of said catch member being fixed to either ends of said swing arms, and said swing arms each comprise two members coupled so as to be rotatable between said spindle and said catch member when under a predetermined load.

13. The car seat according to claim 1, wherein said catch part is swingably supported by a spindle, a holding member is supported at a position below said spindle so as to be swingable back and forth, said catch part, said urging means, and said lock means being mounted on said holding member, and means for urging said holding member backward are provided.

14. A car seat comprising a catch member arranged in a seat cushion so as to prevent a rear end of a passenger from slipping forward upon an abrupt deceleration, said catch member extending in a width direction of said seat cushion, wherein said catch member has at least two bend inducing portions except at its center in the width direction.

15. A car seat comprising a catch member arranged in a seat cushion so as to prevent a rear end of a passenger from slipping forward upon an abrupt deceleration, said catch member extending in a width direction of said seat cushion and being lifted up in front upon an abrupt deceleration, said catch member having a section modulus, said section modulus being larger in a direction of an input load than in a direction orthogonal thereto, said section modulus increasing the rigidity of said catch member.

16. The car seat according to any one of claims 1, 14, and 15, wherein an anchor for fixing a child seat is arranged to lie near a position between a rear end of said seat cushion and a bottom end of a seat back and is fixed to a frame, and a to-be-locked portion arranged on a rear bottom end of said child seat is locked to said anchor.

17. The car seat according to claim 1, comprising lock operation means for switching said lock means between a locked state and an unlocked state.

\* \* \* \* \*